United States Patent
Yim et al.

(10) Patent No.: US 9,521,241 B2
(45) Date of Patent: Dec. 13, 2016

(54) MOBILE TERMINAL AND METHOD OF CONTROLLING THE SAME

(71) Applicant: LG Electronics Inc., Seoul (KR)

(72) Inventors: Soyeon Yim, Seoul (KR); Jonghoon Kim, Seoul (KR); Jinhae Choi, Seoul (KR); Ilhyun Kim, Seoul (KR); Bonjoon Koo, Seoul (KR); Youngjoon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 191 days.

(21) Appl. No.: 14/476,464

(22) Filed: Sep. 3, 2014

(65) Prior Publication Data

US 2015/0264169 A1  Sep. 17, 2015

Related U.S. Application Data

(60) Provisional application No. 61/952,465, filed on Mar. 13, 2014.

(30) Foreign Application Priority Data

Apr. 3, 2014 (KR) .................. 10-2014-0040160

(51) Int. Cl.
*H04M 1/66* (2006.01)
*H04M 3/16* (2006.01)
*H04M 1/68* (2006.01)
*H04M 1/725* (2006.01)
*G06F 1/32* (2006.01)
(Continued)

(52) U.S. Cl.
CPC ........ *H04M 1/72563* (2013.01); *G06F 1/3265* (2013.01); *G06F 3/04883* (2013.01); *G06F 3/04886* (2013.01); *G06F 21/36* (2013.01); *H04M 1/673* (2013.01); *H04W 12/08* (2013.01); *G06F 2200/1636* (2013.01); *G06F 2203/04803* (2013.01); *G06F 2203/04808* (2013.01); *H04M 1/72522* (2013.01); *H04M 1/72583* (2013.01); *H04M 2250/22* (2013.01)

(58) Field of Classification Search
CPC .. H04W 12/12; H04W 12/06; H04M 1/72519; G06F 3/04812; G06F 3/0481
USPC ....... 455/410–411, 550.1; 715/863; 345/173; 717/102
See application file for complete search history.

(56) References Cited

U.S. PATENT DOCUMENTS 7,657,849 B2 * 2/2010 Chaudhri et al. ............. 715/863
2005/0097506 A1 * 5/2005 Heumesser .................. 717/102
(Continued)

FOREIGN PATENT DOCUMENTS

EP        1962480 A2     8/2008
WO   WO 2013/011651 A1   1/2013

*Primary Examiner* — Steve D Agosta
(74) *Attorney, Agent, or Firm* — Birch, Stewart, Kolasch & Birch, LLP

(57) ABSTRACT

A mobile terminal including a terminal body; a display unit configured to switch between an activated state in which lighting is turned on and a deactivated state in which lighting is turned off; and a controller configured to sense a plurality of touch inputs applied to the display unit when the display unit is deactivated, release a locked state of the terminal, when the sensed touch inputs are matched to a pre-set pattern, switch the deactivated display unit to an activated state, and selectively display on the activated display unit at least one execution screen based on characteristics of the sensed touch inputs among a plurality of pre-set execution screens.

12 Claims, 31 Drawing Sheets

(51) Int. Cl.
    *G06F 21/36*     (2013.01)
    *H04M 1/673*     (2006.01)
    *G06F 3/0488*     (2013.01)
    *H04W 12/08*     (2009.01)

(56) References Cited

U.S. PATENT DOCUMENTS

| | | | |
|---|---|---|---|
| 2005/0253817 A1 | 11/2005 | Rytivaara et al. | |
| 2008/0278455 A1 | 11/2008 | Atkins et al. | |
| 2009/0284482 A1 | 11/2009 | Chin | |
| 2010/0162182 A1* | 6/2010 | Oh et al. | 715/863 |
| 2010/0306718 A1* | 12/2010 | Shim et al. | 715/863 |
| 2011/0072400 A1* | 3/2011 | Watanabe et al. | 715/863 |
| 2011/0300831 A1* | 12/2011 | Chin | 455/411 |
| 2011/0316797 A1 | 12/2011 | Johansson | |
| 2012/0229406 A1* | 9/2012 | Wu | 345/173 |
| 2012/0252410 A1* | 10/2012 | Williams | 455/411 |
| 2013/0088442 A1 | 4/2013 | Lee | |
| 2013/0127757 A1* | 5/2013 | Mann et al. | 345/173 |
| 2013/0189952 A1* | 7/2013 | Kim | 455/411 |
| 2013/0318598 A1 | 11/2013 | Meacham | |

* cited by examiner

FIG. 5
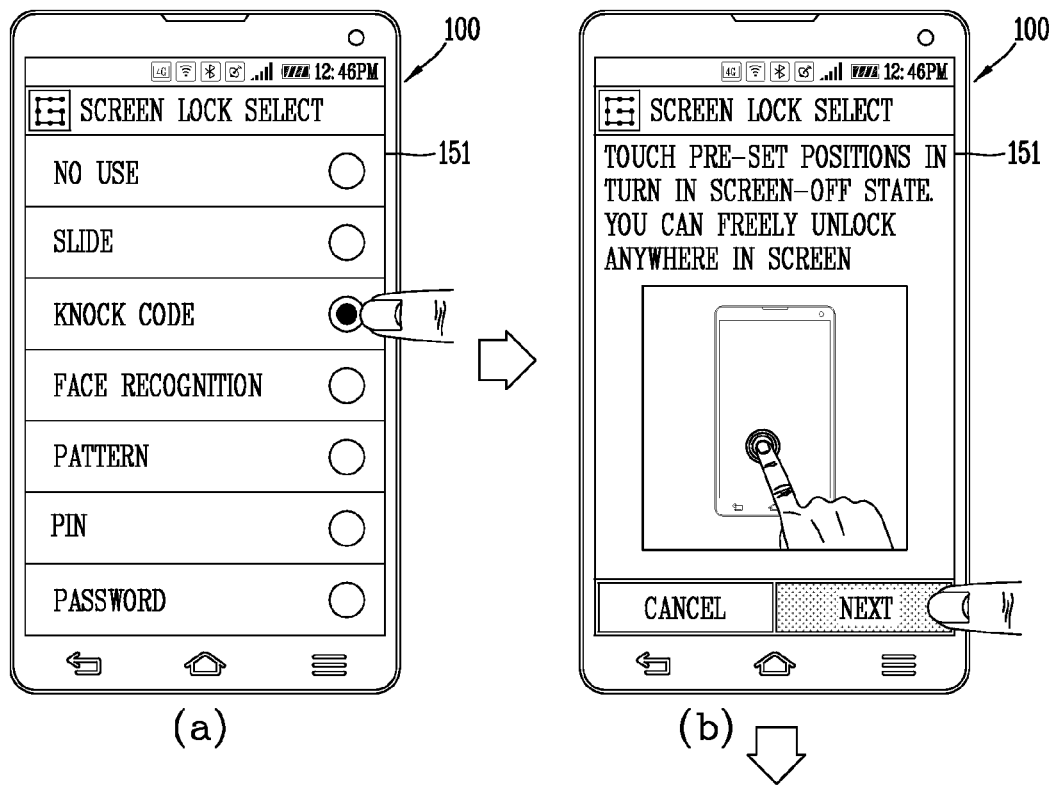
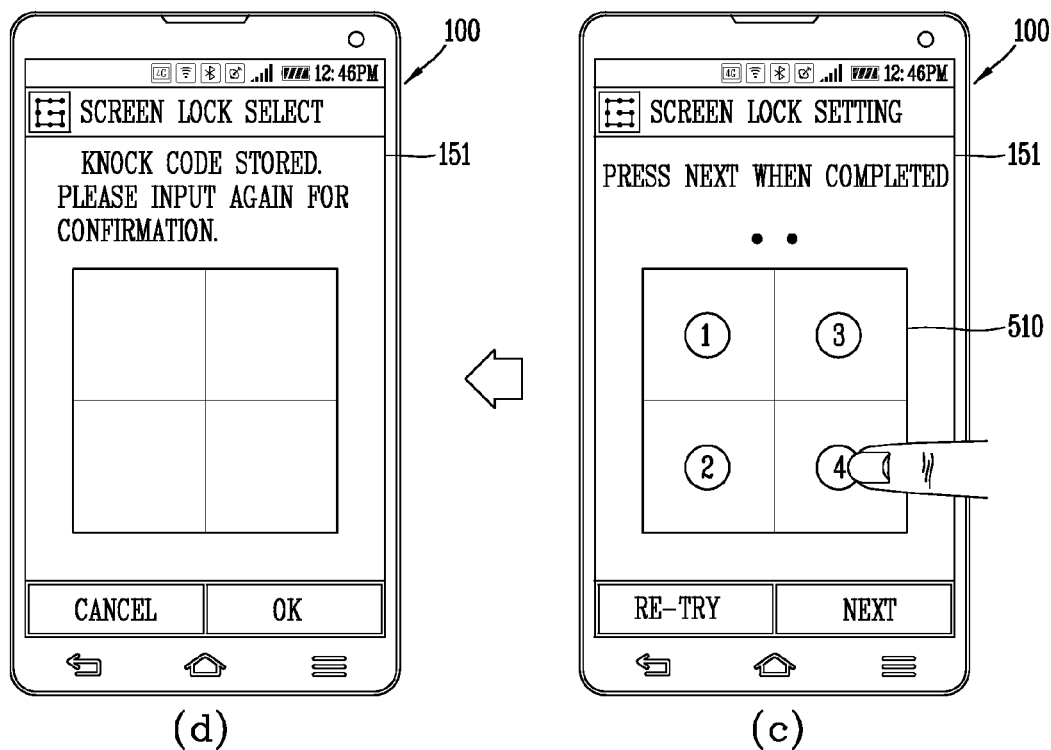

MOBILE TERMINAL AND METHOD OF CONTROLLING THE SAME

CROSS-REFERENCE TO RELATED APPLICATION

Pursuant to 35 U.S.C. §119(a), this application claims the benefit of earlier filing date and right of priority to U.S. Provisional Application No. 61/952,465, filed Mar. 13, 2014 and Korean Application No. 10-2014-0040160, filed on Apr. 3, 2014, the contents of which is incorporated by reference herein in its entirety.

BACKGROUND OF THE INVENTION

1. Field of the Invention

The present invention relates to a mobile terminal capable of sensing a tap applied to a display unit in a deactivated state, and a method of controlling the same.

2. Background of the Invention

Terminals may be generally classified as mobile/portable terminals or stationary terminals. Mobile terminals may also be classified as handheld terminals or vehicle mounted terminals. Mobile terminals also have become increasingly more functional.

Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

In addition, terminals cannot be controlled through simple manipulation when the display unit is deactivated. This is inconvenient for the user and requires the display unit to be activated in order to perform operations.

SUMMARY OF THE INVENTION

Therefore, an aspect of the detailed description is to provide a mobile terminal controlled by applying a tap, which hits an object, to a deactivated display unit, and a control method thereof.

Another object of the detailed description is to provide a mobile terminal capable of switching a locked state to a released state by a pattern directly set by a user and displaying an execution screen corresponding to the pattern, and a control method thereof.

To achieve these and other advantages and in accordance with the purpose of this specification, as embodied and broadly described herein, the present invention provides a mobile terminal including a terminal body; a display unit switched from one of an activated state in which lighting is turned on and a deactivated state in which lighting is turned off to the other; and a controller configured to sense a plurality of touch inputs applied to the display unit in a state in which the display unit is deactivated, release, when the sensed touch inputs are matched to a pre-set pattern, a locked state of the terminal, switch the deactivated display unit to an activated state, and selectively display on the activated display unit at least one execution screen based on characteristics of the sensed touch inputs among a plurality of pre-set execution screens.

In another aspect, the present invention provides a method of controlling a mobile terminal including switching a terminal body from one of an activated state in which lighting is turned on and a deactivated state in which lighting is turned off to the other; sensing a plurality of touch inputs applied to the display unit in a state in which the display unit is deactivated; when the sensed touch inputs are matched to a pre-set pattern, releasing a locked state of the terminal and switching the deactivated display unit to an activated state; and selectively displaying at least one execution screen based on characteristics of the sensed touch inputs among a plurality of pre-set execution screens on the activated display unit.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate embodiments and together with the description serve to explain the principles of the invention.

In the drawings:

FIG. 5 includes conceptual views illustrating en example of setting up a pattern for releasing a locked state in a mobile terminal according to an embodiment of the present invention;

DETAILED DESCRIPTION OF THE INVENTION

Description will now be given in detail according to embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. The accompanying drawings are used to help easily understand various technical features and it should be understood that the embodiments presented herein are not limited by the accompanying drawings. As such, the present invention should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, digital signage, and the like.

Figure 1A:
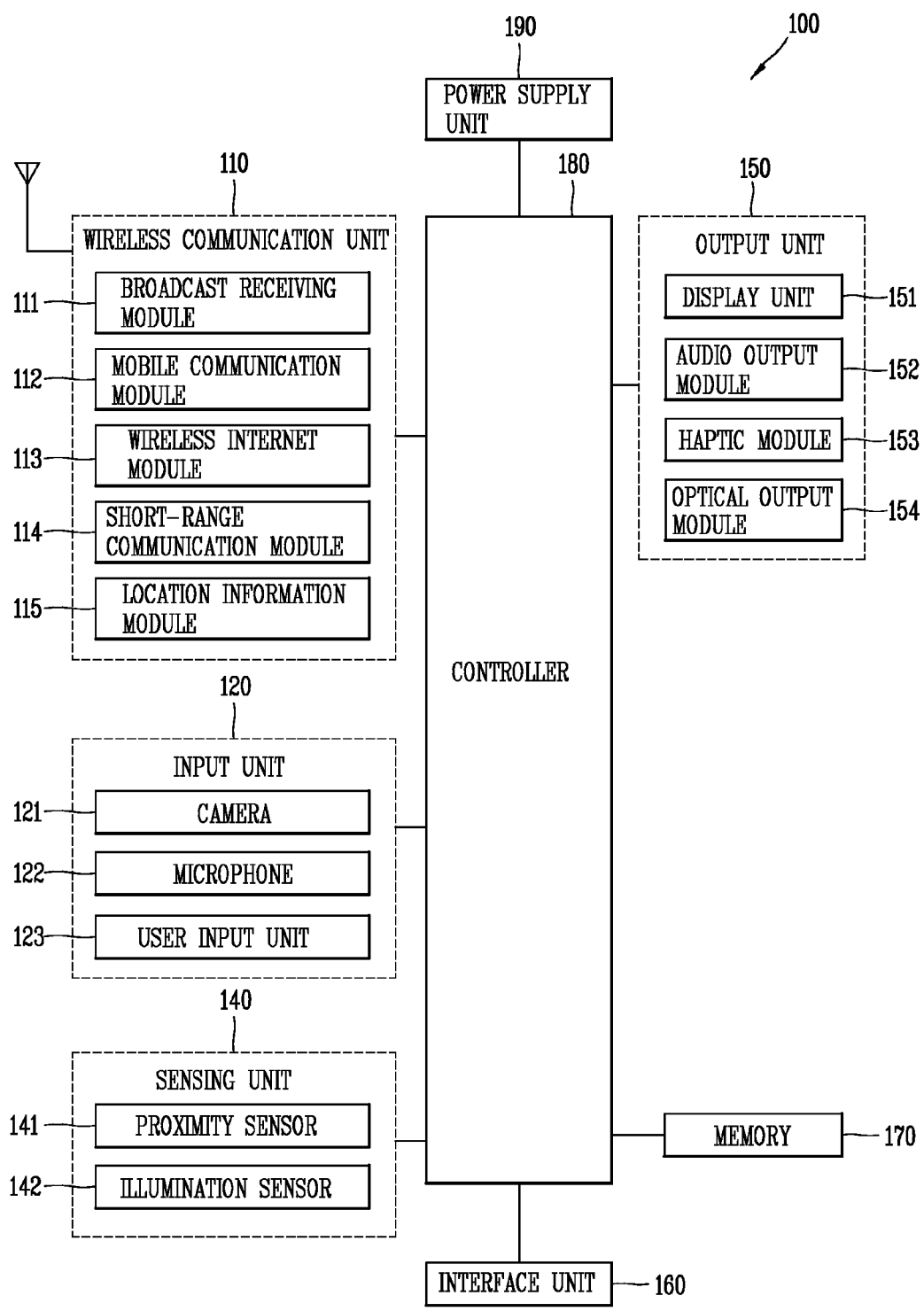
FIG. 1A is a block diagram illustrating a mobile terminal according to an embodiment of the present invention.
Figure 1B:
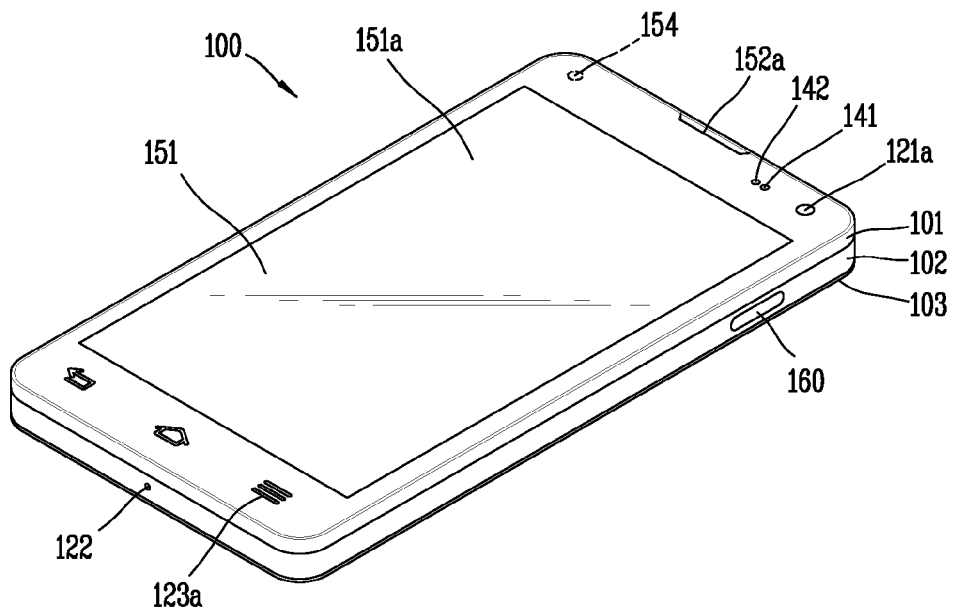
FIGS. 1B and 1C are conceptual views illustrating a mobile terminal viewed in different directions according to an embodiment of the present invention.
Figure 1C:
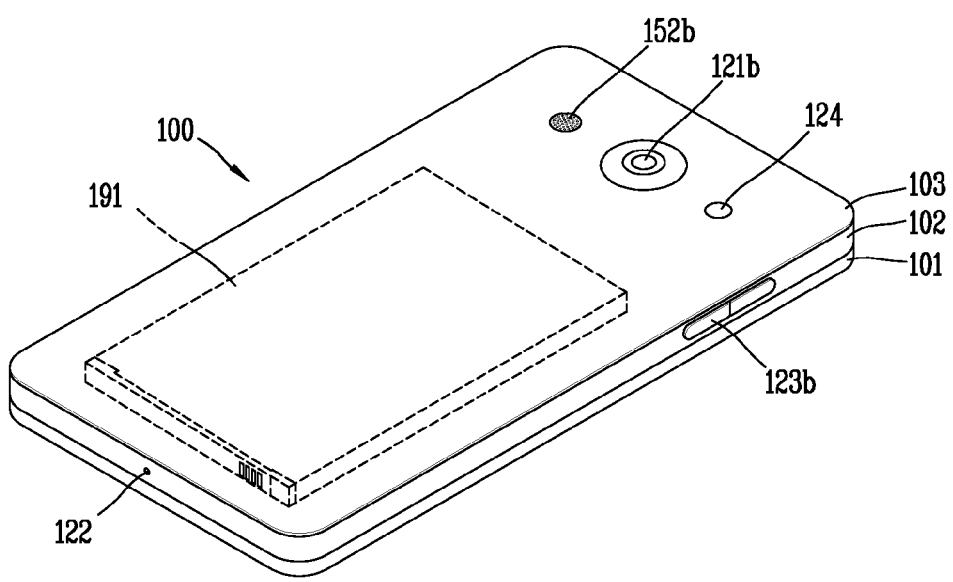

Reference is now made to FIGS. 1A-1C, where FIG. 1A is a block diagram of a mobile terminal in accordance with the present invention, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. Implementing all of the illustrated components is not a requirement, and greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

In order to drive an application program stored in the memory 170, the controller 180 can control at least some of the components described above with reference to FIG. 1A. In addition, in order to drive the application program, the controller 180 can combine two or more of the components included in the mobile terminal 100 to operate the same.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the components may be cooperatively operated to implement operations, control, or control methods of the mobile terminal according to various embodiments described hereinafter. Also, the operations, control, or control methods of the mobile terminal may be implemented in the mobile terminal by driving at least one application program stored in the memory 170.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which can exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. Further, the virtual key or the visual key may be displayed on the touch screen in various shapes, for example, graphic, text, icon, video, or a combination thereof. The user input unit 123 may recognize information sensed by the sensing unit 140, as well as by the aforementioned mechanical input means and touch type input means, as information input from a user. Accordingly, the controller 180 can control an operation of the mobile terminal 100 corresponding to the sensed information.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller 180 can process the received signals, and then transmit corresponding data to the controller 180. Accordingly, the controller 180 can sense which region of the display unit 151 has been touched. Here, the touch controller 180 can be a component separate from the controller 180, the controller 180, and combinations thereof.

In some embodiments, the controller 180 can execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor. Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented so the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 can typically control the general operations of the mobile terminal 100. For example, the controller 180 can set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from as an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like. As an alternative to the example in which the plurality of cases form an inner space for accommodating components, the mobile terminal 100 may be configured such that one case forms the inner space. In this example, a mobile terminal 100 having a uni-body is formed so synthetic resin or metal extends from a side surface to a rear surface.

If desired, the mobile terminal 100 may include a waterproofing unit for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include the display unit 151, first and second audio output units 152a and 152b, the proximity sensor 141, an illumination sensor 142, a light output unit 154, first and second cameras 121a and 121b, first and second manipulation units 123a and 123b, a microphone 122, an interface unit 160, and the like.

Hereinafter, as illustrated in FIGS. 1B and 1C, the mobile terminal 100 in which the display unit 151, the first audio output unit 152a, the proximity sensor 141, the illumination sensor 142, the light output unit 154, the first camera 121a, and the first manipulation unit 123a are disposed on a front surface of the terminal body, the second manipulation unit 123b, the microphone 122, and the interface unit 160 are disposed on the side of the terminal body, and the second audio output unit 152b and the second camera 121b are disposed on a rear surface of the terminal body will be described as an example.

However, the components are not limited to the configuration. The components may be excluded, replaced, or disposed on other surfaces as needed. For example, the first manipulation unit 123a may not be provided on the front surface of the terminal body, and the second audio output unit 152b may be provided on the side of the terminal body, rather than on the rear surface of the terminal body.

The display unit 151 may display (or output) information processed in the mobile terminal 100. For example, the display unit 151 may display executed screen information of an application program driven in the mobile terminal 100, or user interface (UI) information or graphic user interface (GUI) information according to the executed screen information.

The display unit 151 may include a liquid crystal display (LCD), a thin film transistor-liquid crystal display (TFT-LCD), an organic light emitting diode (OLED), a flexible display, a 3-dimensional (3D) display, and an e-ink display.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a receiver and the second audio output unit 152b may be implemented in the form of a loud speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this instance, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof. Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. However, the present invention is not limited thereto and a position of the rear input unit may be modified.

When the rear input unit is provided on the rear surface of the terminal body, a new user interface may be implemented. Also, when the touch screen or the rear input unit as described above replaces at least some functions of the first manipulation unit 123a provided on the front surface of the terminal body so the first manipulation unit 123a is omitted from the front surface of the terminal body, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject. Also, as shown in FIG. 1C, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Hereinafter, a communication system which is operable with the display device 100 according to the present invention will be described. A communication system which is operable with the variously described mobile terminals will now be described in more detail. Such a communication system may be configured to utilize any of a variety of different air interfaces and/or physical layers. Examples of such air interfaces utilized by the communication system include Frequency Division Multiple Access (FDMA), Time Division Multiple Access (TDMA), Code Division Multiple Access (CDMA), Universal Mobile Telecommunications System (UMTS) (including, Long Term Evolution (LTE), LTE-A (Long Term Evolution-Advanced)), Global System for Mobile Communications (GSM), and the like.

By way of a non-limiting example only, further description will relate to a CDMA communication system, but such teachings apply equally to other system types including a CDMA wireless communication system as well as OFDM (Orthogonal Frequency Division Multiplexing) wireless communication system.

A CDMA wireless communication system generally includes one or more mobile terminals (MT or User Equipment, UE) 100, one or more base stations (BSs, NodeB, or evolved NodeB), one or more base station controllers (BSCs), and a mobile switching center (MSC). The MSC is configured to interface with a conventional Public Switched Telephone Network (PSTN) and the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs can be included in the CDMA wireless communication system.

Each base station may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. The base stations may also be denoted as "cell sites." Alternatively, individual sectors of a given base station may be referred to as cell sites.

A broadcasting transmitter (BT) transmits a broadcast signal to the mobile terminals 100 operating within the system. The broadcast receiving module 111 of FIG. 1A is typically configured inside the mobile terminal 100 to receive broadcast signals transmitted by the BT.

Global Positioning System (GPS) satellites for locating the position of the mobile terminal 100, for example, may cooperate with the CDMA wireless communication system. Useful position information may be obtained with greater or fewer satellites than two satellites. It is to be appreciated that other types of position detection technology, (i.e., location technology that may be used in addition to or instead of GPS location technology) may alternatively be implemented. If desired, at least one of the GPS satellites may alternatively or additionally be configured to provide satellite DMB transmissions.

Various embodiments described herein may be implemented in a computer-readable medium, a machine-readable medium, or similar medium using, for example, software, hardware, or any combination thereof.

For a hardware implementation, it may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units designed to perform the functions described herein. In some cases, such embodiments may be implemented in the controller 180 itself.

For a software implementation, the embodiments such as procedures or functions described in the present invention may be implemented with separate software modules. Each of the software modules may perform at least one function or operation described in the present invention. Software codes can be implemented by a software application written in any suitable programming language. The software codes may be stored in the memory 160 and executed by the controller 180.

Information processed in the mobile terminal according to an embodiment of the present invention may be displayed using a flexible display. This will be described in detail with reference to the accompanying drawings.

Figure 2:
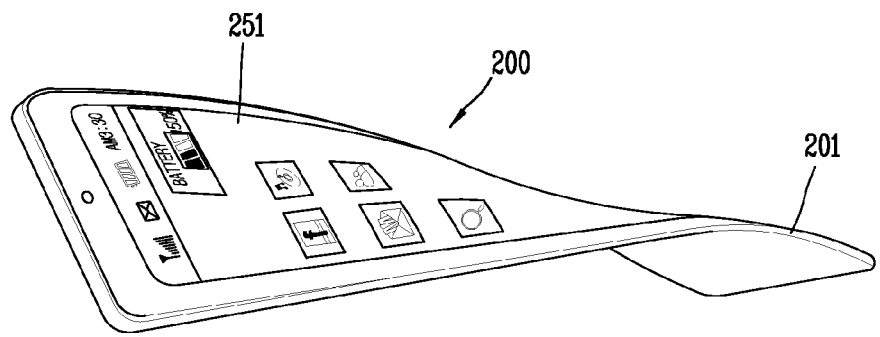
FIG. 2 is a view illustrating a modified example of a mobile terminal according to an embodiment of the present invention.

FIG. 2 is a conceptual view of a deformable mobile terminal according to an alternative embodiment of the present invention. In this figure, mobile terminal 200 is shown having display unit 251, which is a type of display that is deformable by an external force. This deformation, which includes display unit 251 and other components of mobile terminal 200, may include any of curving, bending, folding, twisting, rolling, and combinations thereof. The deformable display unit 251 may also be referred to as a "flexible display unit." In some implementations, the flexible display unit 251 may include a general flexible display, electronic paper (also known as e-paper), and combinations thereof. In general, mobile terminal 200 may be configured to include features that are the same or similar to that of mobile terminal 100 of FIGS. 1A-1C.

The flexible display of mobile terminal 200 is generally formed as a lightweight, non-fragile display, which still exhibits characteristics of a conventional flat panel display, but is instead fabricated on a flexible substrate which can be deformed as noted previously.

The term e-paper may be used to refer to a display technology employing the characteristic of a general ink, and is different from the conventional flat panel display in view of using reflected light. E-paper is generally understood as changing displayed information using a twist ball or via electrophoresis using a capsule.

When the flexible display unit 251 is not deformed (for example, in a state with an infinite radius of curvature and referred to as a first state), a display region of the flexible display unit 251 includes a generally flat surface. When the flexible display unit 251 is deformed from the first state by an external force (for example, a state with a finite radius of curvature and referred to as a second state), the display region may become a curved surface or a bent surface. As illustrated, information displayed in the second state may be visual information output on the curved surface. The visual information may be realized so a light emission of each unit pixel (sub-pixel) arranged in a matrix configuration is controlled independently. The unit pixel denotes an elementary unit for representing one color.

According to one alternative embodiment, the first state of the flexible display unit 251 may be a curved state (for example, a state of being curved from up to down or from right to left), instead of being in flat state. In this embodiment, when an external force is applied to the flexible display unit 251, the flexible display unit 251 may transition to the second state such that the flexible display unit is deformed into the flat state (or a less curved state) or into a more curved state.

If desired, the flexible display unit 251 may implement a flexible touch screen using a touch sensor in combination with the display. When a touch is received at the flexible touch screen, the controller 180 can execute certain control corresponding to the touch input. In general, the flexible touch screen is configured to sense touch and other input while in both the first and second states.

One option is to configure the mobile terminal 200 to include a deformation sensor which senses the deforming of the flexible display unit 251. The deformation sensor may be included in the sensing unit 140 (please refer to FIG. 1A).

The deformation sensor may be located in the flexible display unit 251 or the case 201 to sense information related to the deforming of the flexible display unit 251. Examples of such information related to the deforming of the flexible display unit 251 may be a deformed direction, a deformed degree, a deformed position, a deformed amount of time, an acceleration that the deformed flexible display unit 251 is restored, and the like. Other possibilities include most any type of information which can be sensed in response to the curving of the flexible display unit or sensed while the flexible display unit 251 is transitioning into, or existing in, the first and second states.

In some embodiments, controller 180 or other component can change information displayed on the flexible display unit 251, or generate a control signal for controlling a function of the mobile terminal 200, based on the information related to the deforming of the flexible display unit 251.

The mobile terminal 200 is shown having a case 201 for accommodating the flexible display unit 251. The case 201 can be deformable together with the flexible display unit 251, taking into account the characteristics of the flexible display unit 251.

A battery located in the mobile terminal 200 may also be deformable in cooperation with the flexible display unit 261, taking into account the characteristic of the flexible display unit 251. One technique to implement such a battery is to use a stack and folding method of stacking battery cells.

In accordance with still further embodiments, a mobile terminal may be configured as a device which is wearable on a human body. Such devices go beyond the usual technique of a user grasping the mobile terminal using their hand. Examples of the wearable device include a smart watch, a smart glass, a head mounted display (HMD), and the like. Hereinafter, examples of mobile terminals extending to wearable devices will be described.

A typical wearable device can exchange data with (or cooperate with) another mobile terminal 100. In such a device, the wearable device generally has functionality that is less than the cooperating mobile terminal. For instance, the short-range communication module 114 of a mobile terminal 100 may sense or recognize a wearable device that is near-enough to communicate with the mobile terminal.

In addition, when the sensed wearable device is a device which is authenticated to communicate with the mobile terminal 100, the controller 180 can transmit data processed in the mobile terminal 100 to the wearable device via the short-range communication module 114, for example.

Hence, a user of the wearable device can use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

Figure 3:
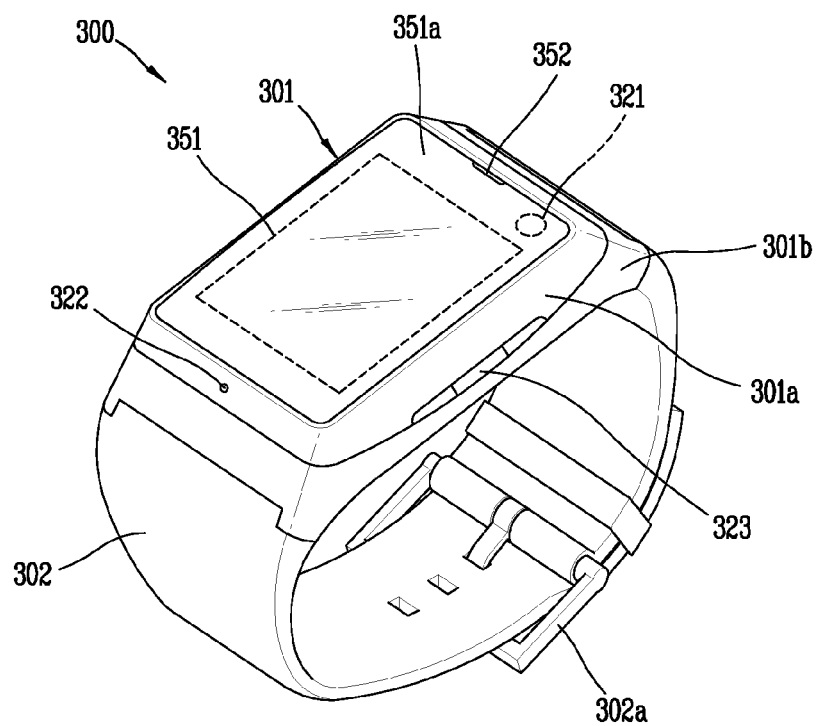
FIG. 3 is a perspective diagram illustrating an example of a watch-type mobile terminal according to another embodiment of the present invention.

FIG. 3 is a perspective view illustrating one example of a watch-type mobile terminal 100 in accordance with another embodiment. As illustrated in FIG. 3, the watch-type mobile terminal 100 includes a main body 301 with a display unit 351 and a band 302 connected to the main body 301 to be wearable on a wrist.

The main body 301 may include a case having a certain appearance. As illustrated, the case may include a first case 301a and a second case 301b cooperatively defining an inner space for accommodating various electronic components. Other configurations are possible. For instance, a single case may alternatively be implemented, with such a case being configured to define the inner space, thereby implementing a mobile terminal 100 with a uni-body.

The watch-type mobile terminal 100 can perform wireless communication, and an antenna for the wireless communication can be installed in the main body 301. The antenna may extend its function using the case. For example, a case including a conductive material may be electrically connected to the antenna to extend a ground area or a radiation area.

The display unit 351 is shown located at the front side of the main body 301 so that displayed information is viewable to a user. In some embodiments, the display unit 151 includes a touch sensor so that the display unit can function as a touch screen. As illustrated, window 351a is positioned on the first case 301a to form a front surface of the terminal body together with the first case 301a.

The illustrated embodiment includes audio output module 352, a camera 321, a microphone 322, and a user input unit 323 positioned on the main body 301. When the display unit 351 is implemented as a touch screen, additional function keys may be minimized or eliminated. For example, when the touch screen is implemented, the user input unit 323 may be omitted.

The band 302 is commonly worn on the user's wrist and may be made of a flexible material for facilitating wearing of the device. As one example, the band 302 may be made of fur, rubber, silicon, synthetic resin, or the like. The band 302 may also be configured to be detachable from the main body 301. Accordingly, the band 302 may be replaceable with various types of bands according to a user's preference.

In one configuration, the band 302 may be used for extending the performance of the antenna. For example, the band may include therein a ground extending portion electrically connected to the antenna to extend a ground area. The band 302 may include fastener 302a. The fastener 302a may be implemented into a buckle type, a snap-fit hook structure, a Velcro® type, or the like, and include a flexible section or material. The drawing illustrates an example that the fastener 302a is implemented using a buckle.

Operations implemented in the mobile terminal including at least one of the components described above will be described in detail with reference to the accompanying drawings. Although a bar-type terminal will be described for the purposes of description, but the present invention is not limited thereto. Namely, the present invention may also be applied to wearable devices such as clocks, glasses, or the like.

In a mobile terminal according to an embodiment of the present invention, a lock mode may be executed, in which inputting a control command by a user is limited simultaneously when a display unit is deactivated. When the lock mode is executed (or when the mobile terminal is locked), the controller 180 displays a locked screen formed to input a password to activate the display unit.

Also, the mobile terminal includes a sensing unit configured to sense a tap applied to the display unit in a state in which the display unit is deactivated. For example, the sensing unit may be a touch sensor for sensing a touch input formed by a tap.

When a plurality of touch inputs are sensed by the sensing unit, the controller 180 analyzes an operation pattern of the user formed by sequentially connecting touch points of the sensed touch inputs. When the analyzed operation pattern is matched with a pre-set pattern, the controller 180 can release the locked state of the mobile terminal, activate the display unit, and display pre-set screen information on the display unit. For example, the pre-set screen information may be a home screen or an execution screen of the last executed application.

Thus, the user can release the locked state of the mobile terminal through a simple gesture of tapping the display unit. Thus, the user can omit processes of pressing a button, or the like, to turn on the display unit and inputting a password using a virtual keypad.

Hereinafter, a novel user interface for controlling a mobile terminal based on an operation pattern of a user formed by sequentially connecting touch points of touch inputs sensed in a state in which a display unit is deactivated will be described with reference to the accompanying drawings.

Figure 4:
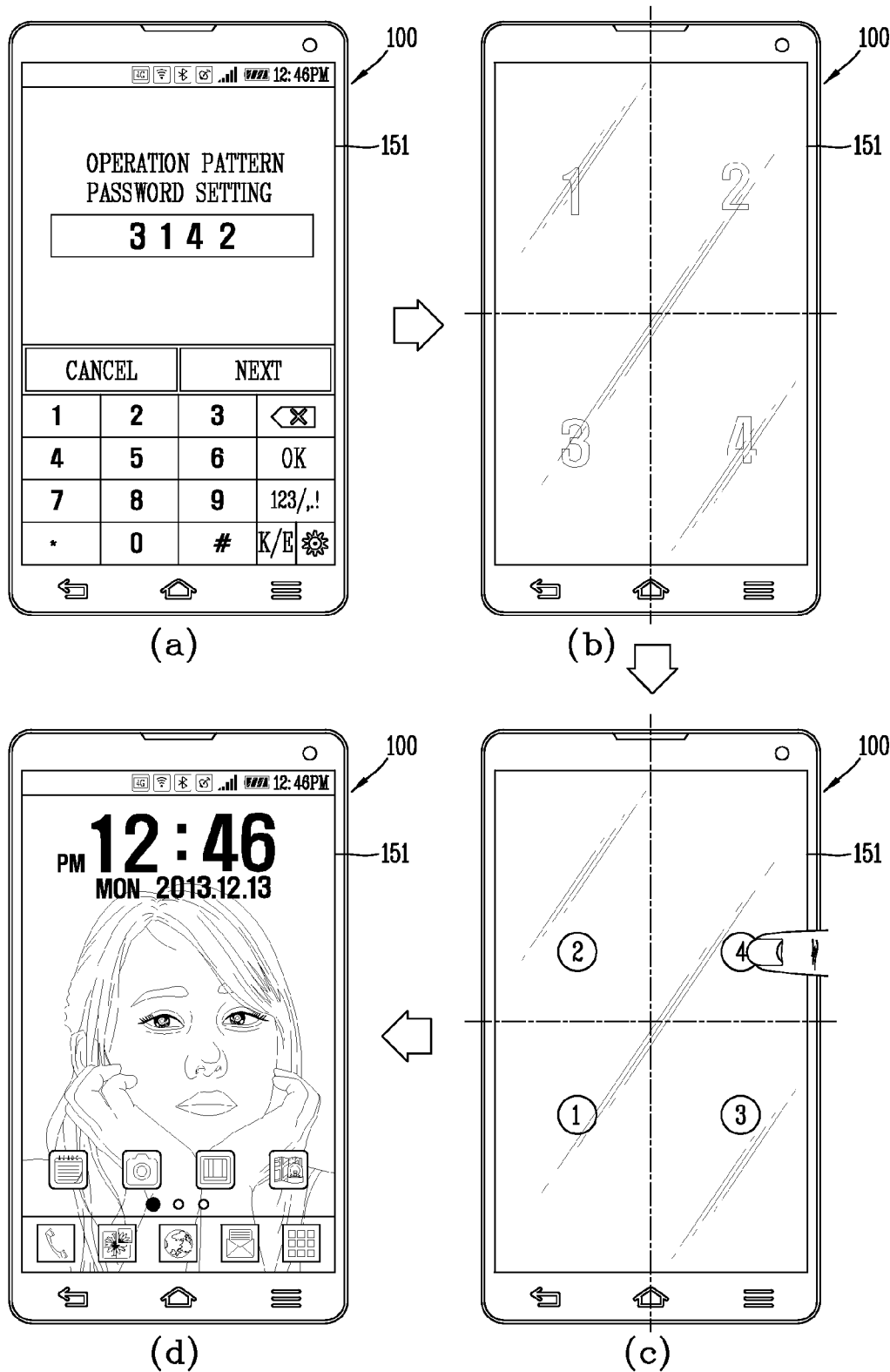
FIG. 4 includes conceptual views illustrating operations implemented according to an embodiment of the present invention.

FIG. 4 includes conceptual views illustrating an operation implemented according to an embodiment of the present invention. First, a method of releasing a locked state by an operation pattern of a user in a mobile terminal according to an embodiment of the present invention with reference to FIG. 4. The mobile terminal 100 (please refer to FIG. 1) includes a sensing unit 140, a display unit 151, and a controller 180.

Here, a locked state refers to a state in which inputting a control command by a user is limited and a state in which locking is not released until a pre-set password is input by a particular person. In the locked state, when the display unit 151 is activated, a locked screen formed to allow inputting of a password may be displayed.

When the locked screen is displayed, the user can apply a pre-set type touch to screen information for unlocking output to the locked screen in order to release the locked state. For example, the pre-set type touch may be a touch drawing a path from a first point of a region of the display unit 151 to a second point different from the first point. Namely, the pre-set type touch may be a touch drawing a pattern by a movement path of the touch.

When the touch for unlocking is completed, the controller 180 can switch a locked state to a released state and output a home screen to the display unit 151. In other words, as the locked state is switched to the released state, the mobile terminal can enter a mode in which at least a portion of a plurality of applications installed in the mobile terminal is executable.

Meanwhile, in the mobile terminal according to an embodiment of the present invention, the locked state of the mobile terminal is released based on an operation pattern formed by a plurality of touch inputs applied to the display unit when the display unit 151 is deactivated. In more detail, the operation pattern may be defined as a pattern formed by sequentially connecting touch points of the plurality of touch inputs.

As a result, the mobile terminal is immediately unlocked by the plurality of touch inputs applied in the deactivated state, and pre-set screen information is displayed. In other words, the user can unlock the mobile terminal even without having to input a password to the display unit displaying a locked screen. Operations implemented by an embodiment of the present invention will now be described in detail with reference to FIGS. 4(a) to 4(d).

In order to switch a locked state to a released state, a password for unlocking needs to be input. Such a password may be set in advance when mobile terminals are released or may be set or edited by users. For example, referring to FIG. 4(a), a password input window (or a pin code input window) for receiving a password may be displayed on the display unit 151 of the mobile terminal.

The password input window includes at least one virtual keypad, and in more detail, the virtual keypad may be a number keypad. Based on a user input applied to the virtual keypad, the controller 180 can set a password for unlocking. For example, as illustrated in FIG. 4(a), "3142" may be set as a password for unlocking the mobile terminal 100.

Meanwhile, the controller 180 sets up (or registers) an operation pattern for switching a locked state to a released state based on the set password. The operation pattern may be formed by a plurality of taps applied to the mobile terminal. In more detail, the operation pattern may be formed by sequentially connecting touch points of touch inputs formed by the taps. For example, an operation pattern forming vertices of an upper case of alphabet "N" may be set up by sequentially connecting touch points formed by applying four taps.

In order to set up the operation pattern, the controller 180 can divided the entire region of the display unit 151 into a plurality of regions and set up an operation pattern of the user using the divided regions. For example, when a set password is "3142", the controller 180 can divide the display unit 151 based on the greatest number "4" among the input numbers. For example, as illustrated in FIG. 4(b), the controller 180 can divide the display unit 151 into four virtual regions. In another example, regardless of the set password, the display unit 151 may be divided into a pre-set number of regions.

The plurality of divided virtual regions may be given identification numbers in order from left to right or from top to bottom (for example, when the display unit 151 is divided into a total of four virtual regions, first to fourth virtual regions are given identification numbers).

No information is displayed on the display unit 151 in a deactivated state, and thus, the plurality of regions correspond to virtual regions. In other words, since lines partitioning the regions or identification numbers respectively denoting the divided regions are virtual, they are not displayed on the display unit 151 in actuality. When the display unit 151 is deactivated, information related to the plurality of regions may not be output, while virtual lines partitioning the virtual regions, numbers respectively denoting the virtual regions, and a circular figure guiding a touch input may be displayed on the drawings for the purposes of description.

Meanwhile, in an embodiment of the present invention, a password is set up by four digits, and accordingly, the entire region of the display unit 151 is not limited to the dividing of the entire region into four virtual regions. Namely, the controller 180 can divided the display unit into a plurality of regions. For example, the controller 180 can bisect the display unit 151 into upper and lower regions or may trisect the display unit 151 into upper, middle, and lower regions according to a set password, and various operation patterns may be set accordingly.

Subsequently, the controller 180 can set sequentially applying first to fourth touch inputs to the third virtual region, the first virtual region, the fourth virtual region, and the second virtual region, as an operation pattern.

Hereinafter, a pattern previously set to release a locked state of the mobile terminal will be referred to as a "knock code." When a knock code is set up, the controller can execute a locked state and activate or deactivate the display unit 151.

Here, a "deactivated state of the display unit 151" may refer to a state in which lighting provided inside the display unit 151 to illuminate the display unit 151 is in an OFF state. For example, as illustrated in FIG. 4(b), when the display unit 151 is deactivated, any information or graphic image is not displayed on the display unit 151.

In contrast, an "activated state of the display unit 151" refers to a state in which lighting provided inside the display unit 151 to illustrate the display unit 151 is in an ON state. When the display unit 151 is activated, different pieces of screen information are displayed on the display unit under the control of the controller 180. In order to activate the display unit 151 in the locked state, the controller 180 can display a locked screen related to input of password information in order to receive password information for releasing the locked state from the user.

Meanwhile, when the display unit 151 is deactivated, a plurality of touch inputs applied to the display unit 151 may be sensed. In this instance, the controller 180 analyzes an operation pattern formed by sequentially connecting the touch points of the sensed touch inputs. When the analyzed operation pattern is identical to a pre-set pattern, the controller 180 executes an unlocking function. The unlocking function refers to a function of releasing the locked state, switching the deactivated state of the display unit to an activated state, and displaying pre-set screen information on the activated display unit 151.

Namely, when the sensed touch inputs on the display unit in the deactivated state are matched to a pre-set pattern (or a "knock code"), the controller 180 releases the locked state and switches the deactivated state of the display unit to an activate state.

Here, the "sensed touch inputs" refers to a plurality of touch inputs sensed on the display unit 151 in the deactivated state. In more detail, the sensed touch inputs refer to a plurality of touch inputs sequentially applied to at least one of the virtual regions of the display unit 151 divided into the virtual regions.

Meanwhile, when the sensed touch inputs include a plurality of touch inputs sequentially applied to at least one of the virtual regions according to a pre-set pattern, the controller 180 determines that the sensed touch inputs are matched to the pre-set pattern. Alternatively, when a configuration formed by sequentially connecting the sensed touch inputs according to applied order is identical to a configuration formed by the pre-set pattern, the controller 180 may determine that the sensed touch inputs are matched to the pre-set pattern. In other words, the controller 180 determines that a knock code has been received.

For example, as illustrated in FIG. 4(c), when first to fourth touch inputs ①, ②, ③, and ④ sequentially applied to a third virtual region→a first virtual region→a fourth virtual region→a second virtual region are sensed, the controller 180, since the sensed touch inputs form a pre-set pattern (for example, "N"), the controller 180 can determine that a release command has been received.

In such a case, as illustrated in FIG. 4(d), the controller 180 can execute an unlocking function. In other words, the controller 180 can activate the display unit 151 and display a home screen. The home screen may include at least one object, and the at least one object may be an icon or a widget of an application installed in the mobile terminal.

Meanwhile, when the mobile terminal is switched to a released state, a first output screen may not necessarily be a home screen. For example, the last screen information output to the display unit 151 before the locked state was executed may be displayed as pre-set screen information.

Further, at least one of positions and sizes of the virtual regions formed on the display unit may be varied based on touch points of the display unit at which a plurality of touch inputs are sensed. In other words, a plurality of touch inputs matched to the pre-set pattern may form knock codes with different sizes. For example, the sensed touch inputs may be matched to the pre-set pattern to form a knock code corresponding to a first size or may be matched to the pre-set pattern to form a knock code corresponding to a second size different from the first size.

According to the driving scheme as described above, when the display unit 151 is deactivated, the user can input a knock code for unlocking to a different position and/or with a different size. For example, the user, with the mobile terminal held in his or her right hand, can apply a knock code with the thumb of his or her right hand. In this instance, a touch input may be applied within a range that the thumb of the user reaches (for example, a right lower end region of the display unit), and only when a pattern having a shape identical to that of a pre-set pattern is formed by the same number of touch inputs, the controller 180 can release the locked state.

Accordingly, the mobile terminal according to an embodiment of the present invention may provide a more intuitional, simpler user interface environment to the user. Also, in the related art, in order to release a locked state, the user has to activate the display unit 151 using a button, or the like, and input a password using a virtual keypad, but in the foregoing embodiment, such shortcomings are solved. Thus, even when the display unit is deactivated, the user can control the mobile terminal according to a novel method of the present invention.

Further, in the mobile terminal according to an embodiment of the present invention, when a locked state is released by a knock code, the controller 180 can execute different functions based on characteristics of touch inputs applied to the display unit 151 in a deactivated state. Accordingly, different execution screens may be displayed on the display unit 151 when the locked state is released.

When the sensed touch inputs are matched to a pre-set pattern and have first characteristics, the controller 180 can release the locked state and display a first execution screen on the display unit 151, and when the sensed touch inputs are matched to the pre-set pattern and have second characteristics different from the first characteristics, the controller 180 releases the locked state and displays a second execution screen different from the first execution screen on the display unit 151.

Namely, the user can release the locked state and simultaneously control the terminal to display different execution screens by using a single knock code. For example, when the user applies a knock code using a finger, a home screen may be displayed, and when the user applies a knock code using a touch pen, a memo function may be executed to display a corresponding execution screen.

The characteristics of the knock code displaying different execution screens may be previously set in the memory 160 or may be added, deleted, and edited by the user. Namely, certain characteristics of the knock code and an execution screen corresponding to the certain characteristics are stored in the memory 160. When a knock code is received by the display unit 151 in a deactivated state, the controller 180 can release a locked state based on the information stored in the memory 160 and display an execution screen corresponding to the characteristics of the received knock code on the display unit 151.

Hereinafter, a method of setting a knock code will be described with reference to FIG. 4, and certain characteristics of a knock code and a method of setting an execution screen corresponding to the certain characteristics will be described in detail with reference to FIG. 6. Also, for the purposes of description, as illustrated in FIG. 4, sensed touch inputs are illustrated to be simplified as circular figures. Numbers within the circular figures indicate order in which touch inputs have been applied, and positions of the circular figures correspond to positions to which touch inputs have been applied.

FIGS. 5(a) through 5(d) are conceptual views illustrating an embodiment for setting a pattern for releasing a locked state in a mobile terminal according to an embodiment of the present invention.

First, a method of setting a knock code as a function of releasing a locked state by applying a plurality of touch inputs to a display unit in a deactivated state will be described. Here, as discussed above, a knock code refers to a pre-set pattern for releasing a locked state. Such a knock code may be stored in the memory 160 when the terminal is released, or may be added, deleted, or edited by a terminal user.

In the mobile terminal according to an embodiment of the present invention, as illustrated in FIG. 5(a), the user can directly set at least one method of releasing a locked state. For example, when the user sets "no use", if a user input is not sensed for a pre-set period of time, a display unit is merely deactivated and the terminal is not switched to a locked state. In contrast, when a knock code is set, a locked state is not released until when a plurality of touch inputs matched to a pre-set pattern are input.

In addition, a method of releasing a locked state may include a slide scheme based on a touch continuously moving from a first point to a second point, a face recognition scheme, a pattern scheme based on a movement path of a touch, a PIN scheme based on numbers, a scheme of inputting a password including numbers, and the like.

Meanwhile, when a knock code is selected as a method of releasing a locked state as illustrated in FIG. 5(a), the controller 180 provides guide information describing a function of the knock code as illustrated in FIG. 5(b). The screen describing the knock code may be output only when the knock code is initially set.

Thereafter, as illustrated in FIG. 5(c), the controller 180 outputs guide information for receiving a knock code. The guide information includes virtual regions 510 for receiving a knock code. The virtual regions are not limited to the four virtual regions and may be formed in various other forms such as upper and lower virtual regions (two virtual regions) or upper, middle, and lower virtual regions (three virtual regions) according to an embodiment of the present invention.

The controller 180 senses a plurality of touch inputs sequentially applied to at least one region of the virtual regions 510, and sets a knock code based on touch order and at least one touched region. For example, as illustrated in FIG. 5(c), the controller 180 can set applying the first to fourth touch inputs sequentially to the first virtual region, the third virtual region, the second virtual region, and the fourth virtual region, as a knock code.

As illustrated in FIG. 5(d), when the same knock code is input again, the controller 180 stores the knock code in the memory 160. When the knock code is set, a lock function is executed by the knock code. Here, the lock function refers to a function of automatically executing a locked state when the display unit 151 in an activated state is switched to a deactivated state. In the locked state, when a plurality of touch inputs matched to a pre-set pattern are applied to the display unit 151 in the deactivated state, the locked state is released and the display unit 151 is activated.

Meanwhile, the controller 180 can display at least one of execution screens on the activated display unit 151 based on the characteristics of the knock code. Namely, although one knock code has been set for an unlocking operation, the user may control the mobile terminal to display various execution screens using the single knock code.

Hereinafter, certain characteristics of the knock code and a method of setting an execution screen corresponding to the certain characteristics in the mobile terminal according to an embodiment of the present invention will be described in detail.

In the mobile terminal according to an embodiment of the present invention, a function executed when a locked state is released by a knock code (hereinafter, the function executed when a locked state is released will be referred to as a "shortcut function") may be set in the mobile terminal. In more detail, the user can select certain characteristics among a plurality of characteristics of the pre-set knock code, and select a shortcut function corresponding to the selected circuit characteristics.

Thus, different control functions can be executed according to characteristics of the knock code, and an execution screen corresponding to an executed control function is displayed. Namely, as a plurality of touch inputs are sensed, a locked state is released and at least one execution screen corresponding to the characteristics of the sensed touch inputs is displayed. The shortcut function may also be referred to as "immediate execution of App with knock code."

Figure 6A:
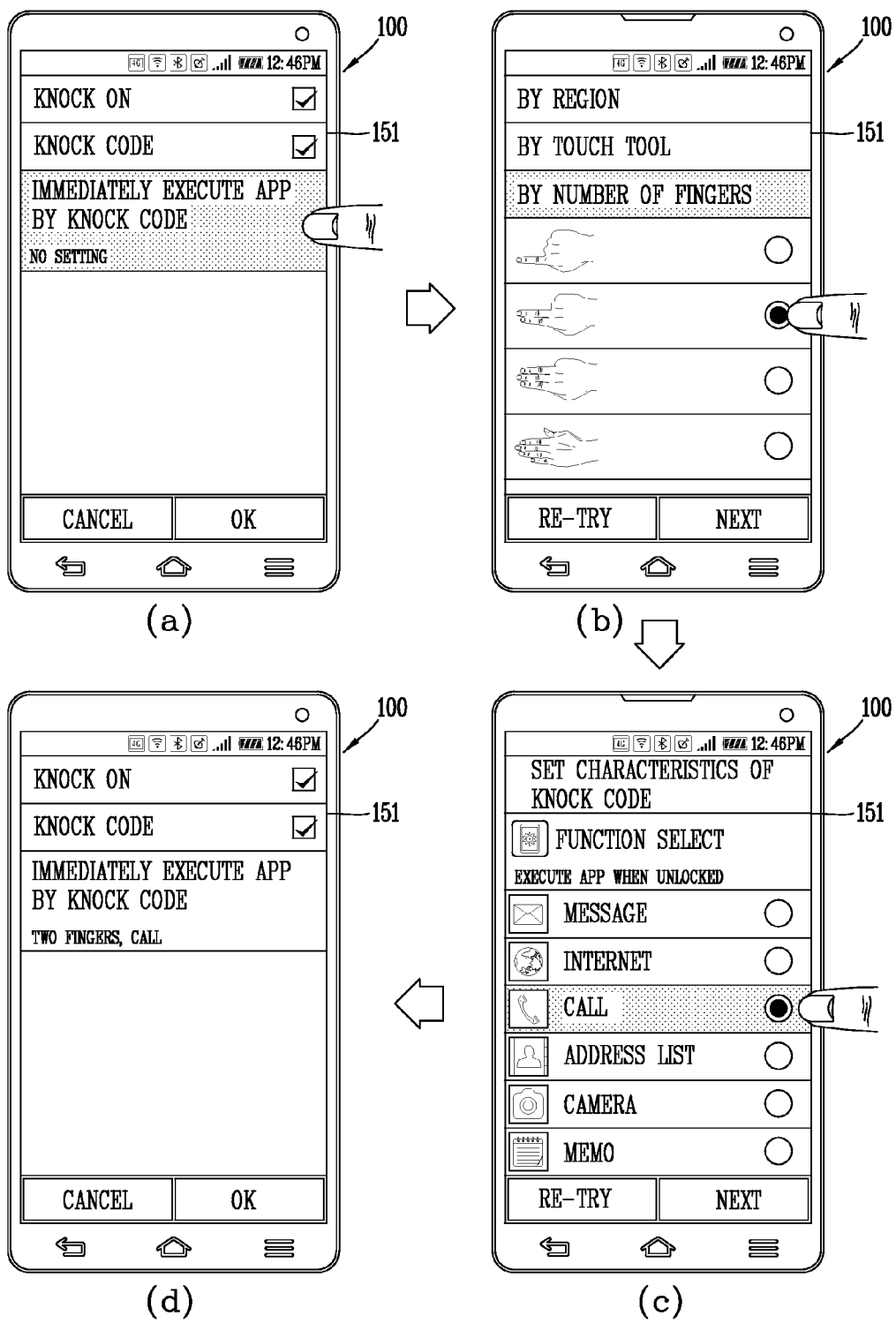
FIGS. 6A through 6C are conceptual views illustrating an example of releasing a locked state and registering characteristics of touch inputs for executing shortcut in a mobile terminal according to an embodiment of the present invention.
Figure 6B:
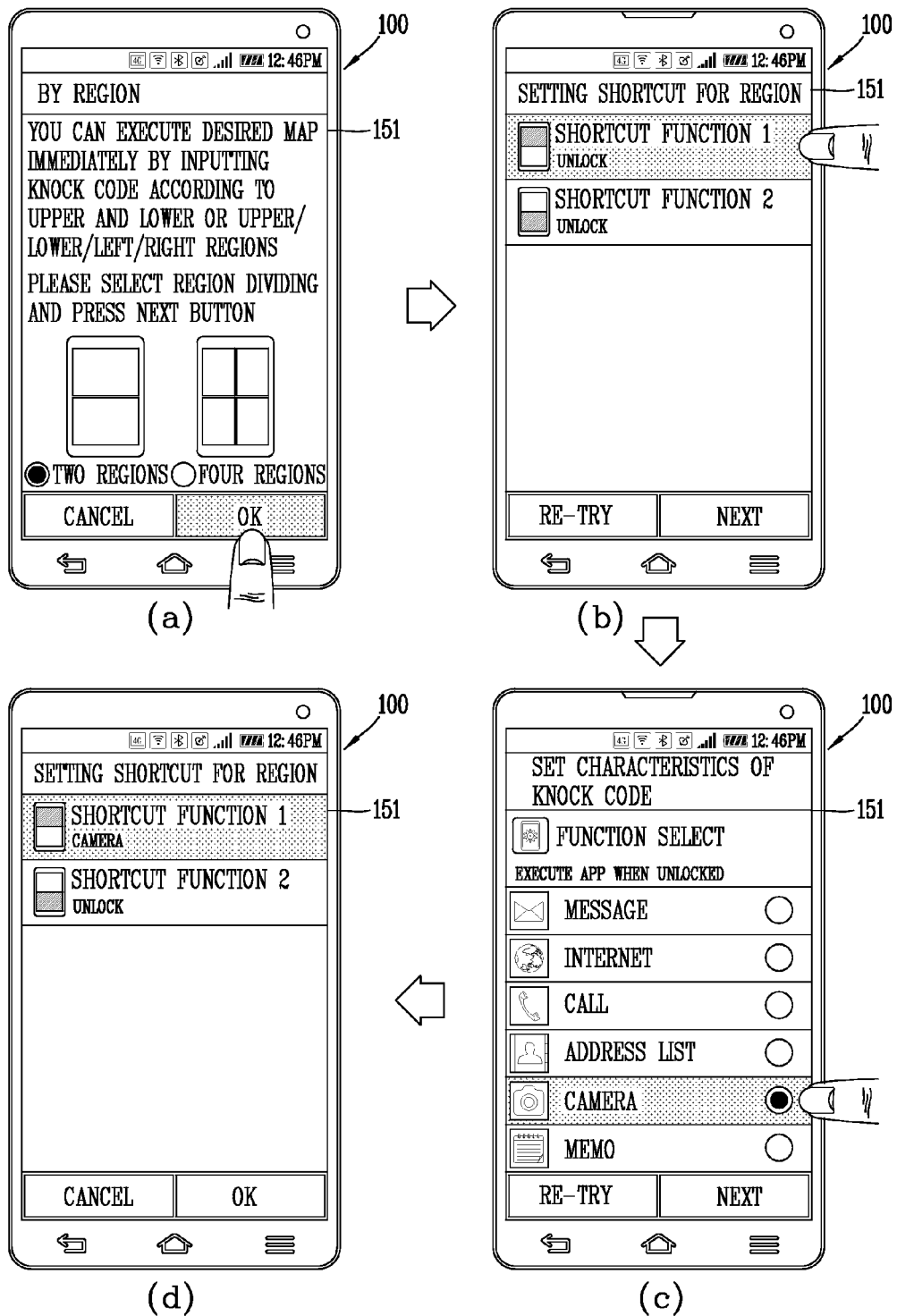
Figure 6C:
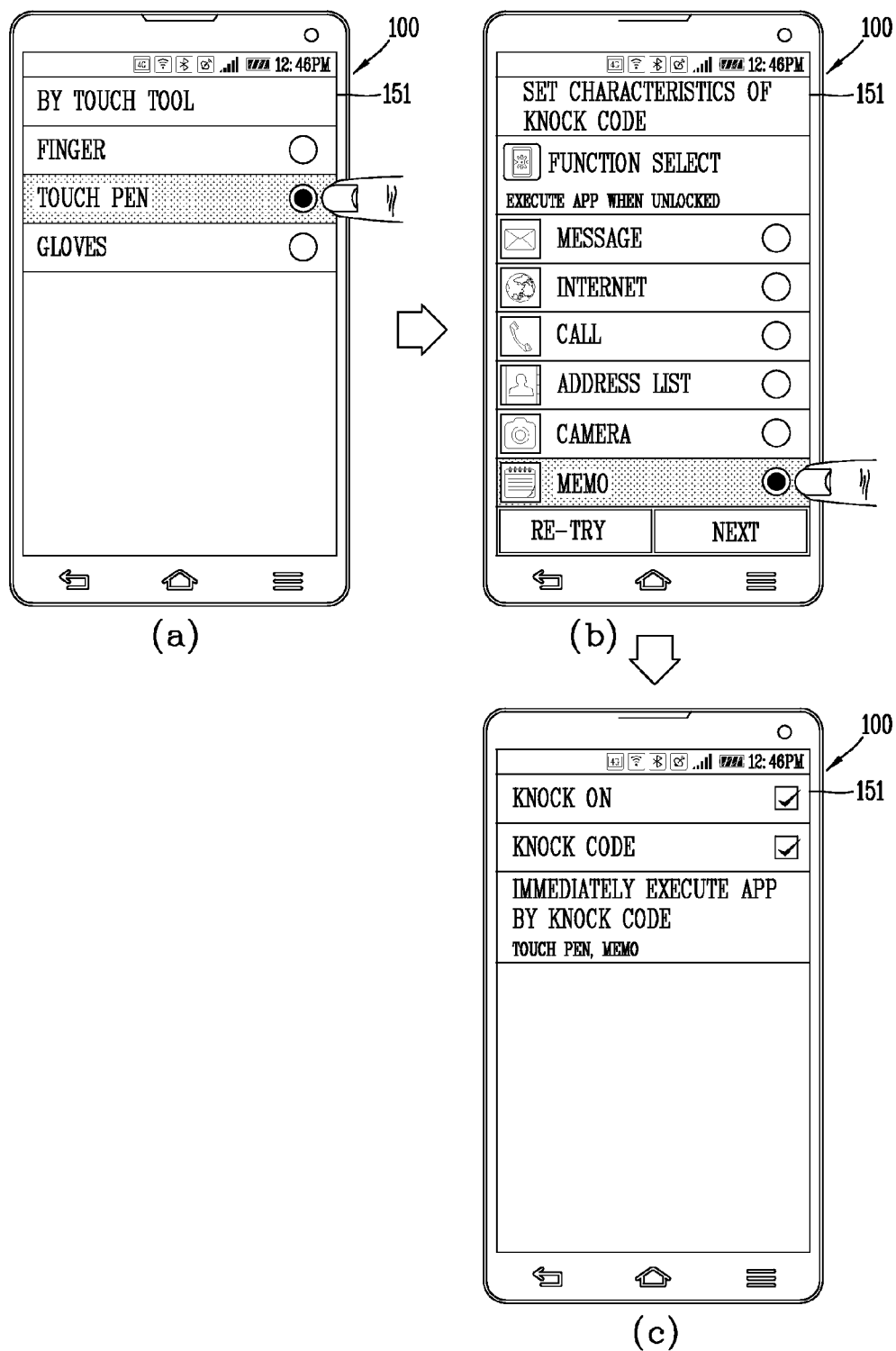

Next, FIGS. 6A through 6C are conceptual views illustrating an example of releasing a locked state and registering characteristics of touch inputs for executing shortcut in a mobile terminal according to an embodiment of the present invention.

The user can set characteristics of a knock code (or characteristics of touch inputs) for executing a shortcut function and a function corresponding to the characteristics. In this instance, the characteristics of the knock code may relate to at least one of a position of an area to which a plurality of touch inputs have been applied, a size of the area to which the plurality of touch inputs have been applied, a type of object used to apply the plurality of touch inputs, and the number of touches included a final touch input among the plurality of touch inputs.

First, as illustrated in (a) of FIG. 6A, the user can select characteristics of a knock code for executing a shortcut function. In more detail, the controller 180 can select at least one of characteristics of a knock code corresponding to regions, touch tools, and the number of finger, based on a user input. For example, as illustrated in (b) of FIG. 6A, characteristics of a knock code corresponding to two fingers may be selected.

Next, the user can set a function corresponding to the selected characteristics. For example, as illustrated in (c) of FIG. 6A, a list of a plurality of functions executable on the mobile terminal may be displayed on the display unit 151. The controller 180 can select at least one of the functions included in the list based on a user input.

Thereafter, the controller 180 can select at least one selected function as a shortcut function. For example, as illustrated in (d) of FIG. 6A, the controller 180 can set a shortcut function to execute a call function with respect to the characteristics of the knock code input by two fingers. Accordingly, when a knock code is input by two fingers, the controller 180 can release a locked state, execute a call function, and display an execution screen including a virtual keypad formed to allow inputting of a phone number on the display unit 151.

Also, in the mobile terminal according to an embodiment of the present invention, the controller 180 can designate a region to which a knock code is to be input, and set a shortcut function corresponding to the designated region. In more detail, the controller 180 can specify characteristics of a knock code based on at least one of a position and size of the region to which touch inputs are to be applied, and set a shortcut function corresponding to the at least one of the position and the size of the region.

First, the controller 180 specifies a region for setting a shortcut function in the entire region of the display unit 151. For example, the entire region of the display unit 151 may be divided into two or four execution regions as illustrated in (a) of FIG. 6B, and the user may select at least one region for setting a shortcut function from among the divided regions as illustrated in (b) of FIG. 6B.

In addition, at least one execution region for setting a shortcut function may be directly received from the user. For example, when a figure is formed by a touch trace, a region surrounded by the touch trace (or the interior of the figure) may be specified as a region for setting a shortcut function.

In another example, when a region setting mode for setting a shortcut function is executed, the controller 180 can set a plurality of grid cells and the display unit 151 may display the set grid cells. For example, the display unit 151 may display 20 grid cells (4 (width)×5 (length)=20) each having the same size as an initial setting. However, the size and number of the grid cells displayed on the screen are not limited thereto and may be variously modified.

Although a region setting mode is executed and grid cells are set, the display unit 151 may not display the grid cells. Namely, the grid cells may be merely internally set by the controller 180, without being displayed on the screen.

When displaying the grid cells, the display unit 151 may display a plurality of lines demarcating grid cells and display a plurality of nodes at intersections of the lines. The lines and the nodes may be moved based on a touch input, for example, a drag, applied to the display unit 151. Accordingly, a layout of the grid cells may be changed in the region setting mode.

The controller 180 can select at least one of the cells based on a user input to set a shortcut function. A region corresponding to the at least one selected cell may be specified as a region for setting a shortcut function.

Thereafter, the controller 180 sets a function corresponding to the specified region as a shortcut function. For example, as illustrated in (c) of FIG. 6B, a list including a plurality of functions executable on the mobile terminal may be displayed on the display unit. The user can select at least one of the functions included o the list to set a function (or a shortcut function) to be executed immediately when a locked state is released.

Accordingly, as illustrated in (d) of FIG. 6B, a shortcut function for the specified region is set. Namely, when a plurality of touch inputs matched to a pre-set pattern are applied to an upper region of the display unit, a camera function is executed, and as the camera function is executed, a corresponding execution screen is displayed.

Also, in the mobile terminal according to an embodiment of the present invention, the controller 180 can determine by which object a touch input sensed by the touch sensor has been applied. In more detail, the controller 180 determines a type of object (or a touch tool) which has applied a touch input based on strength of applied touch input, an area of the applied touch input, an amount of change in electric charge, and the like.

Based on the determined object, the controller 180 can set a shortcut function according to the type of object used to apply the knock code. For example, as illustrated in FIG. 6C, characteristics of touch tools such as a finger, a touch pen, a globe, or the like, are selected, and a shortcut function corresponding to the selected characteristics may be set.

Further, certain characteristics of the knock code and the function corresponding to the certain characteristics are not limited to the foregoing embodiments and can be variously configured such that one or more embodiments are combined, or the like.

As described above, the shortcut function may be set by the user or may be automatically set when a knock code is set. In more detail, when a knock code is set, the controller 180 can set a shortcut function according to a pre-set scheme in order to provide an optimal user interface. For example, the controller 180 can set a shortcut function such that a memo function is executed when a knock code is applied by a touch pen. According to this driving scheme, a shortcut function appropriate for certain characteristics of the knock code may be automatically set, implementing a novel user interface. Also, since the user may edit the automatically set shortcut function, a user-friendly interface is provided.

Hereinafter, a control method using a plurality of touch inputs applied to a deactivated display unit in the mobile terminal according to an embodiment of the present invention will be described in detail with reference to FIG. 7. In particular, FIG. 7 is a flow chart illustrating a method of controlling a mobile terminal according to an embodiment of the present invention.

Figure 7:
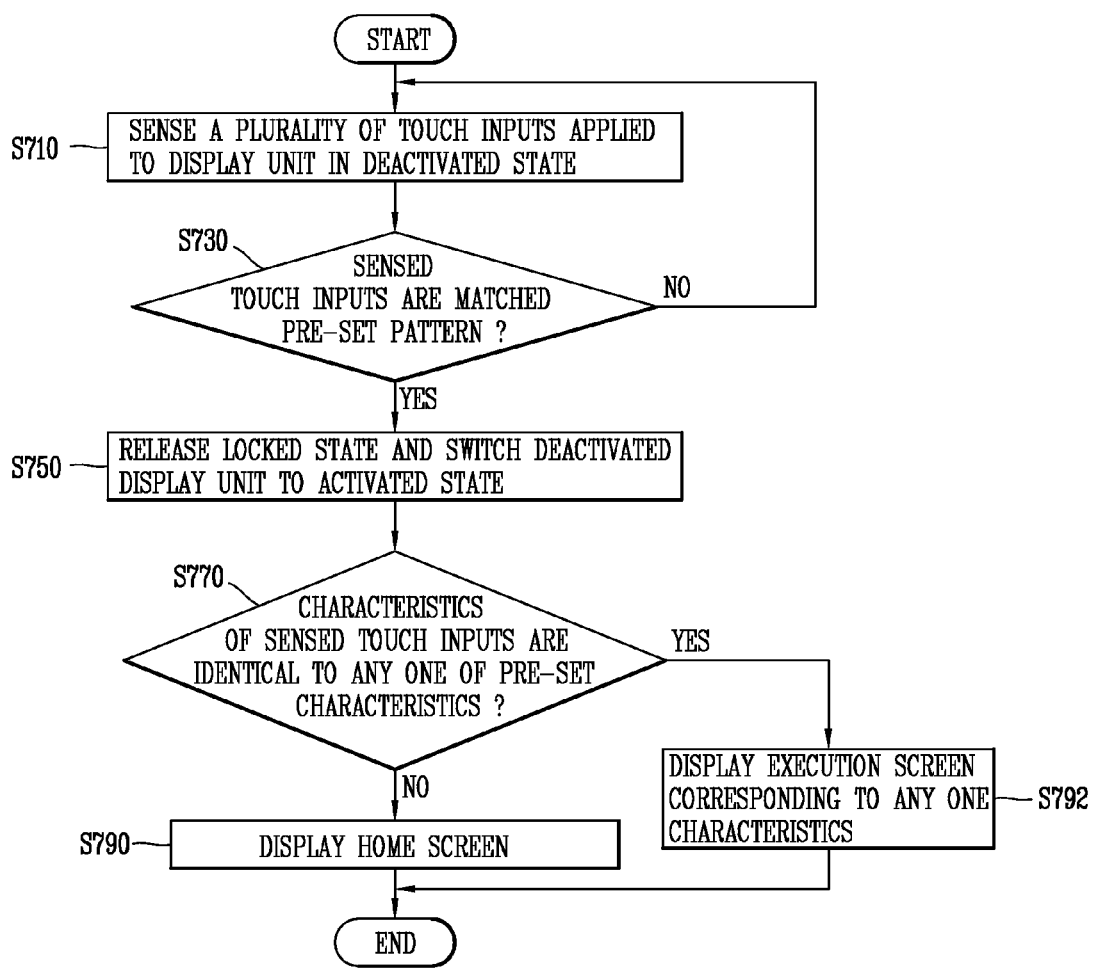
FIG. 7 is a flow chart illustrating a method of controlling a mobile terminal according to an embodiment of the present invention.

First, referring to FIG. 7, when the display unit 151 is deactivated, a plurality of touch inputs applied to the display unit 151 is sensed in step S710. Again, the "deactivated state of the display unit 151" refers to a state in which lighting provided inside the mobile terminal to illuminate the display unit 151 is in an OFF state. Namely, when the display unit 151 is deactivated, no information or graphic image is displayed on the display unit 151.

Meanwhile, the sensing unit 140 senses a tap applied to the terminal body regardless of whether the display unit 151 is activated. Here, a tap or a tap gesture may denote a gesture hitting the body 100 of the mobile terminal or an object. More specifically, a tap may be understood as an operation of slightly hitting the mobile terminal body 100 or object with a tap subject such as a finger and the like or an operation of allowing a tap subject to be slightly brought into contact with the mobile terminal body 100 or object. For example, when the sensing unit 140 is a touch sensor, the touch sensor may sense a tap by sensing a touch input generated by a tap.

Meanwhile, the tap subject applying such a tap may be a thing capable of applying an external force to the mobile terminal body 100 or object, for example, finger (part with a fingerprint), stylus pen, pen, pointer, first (finger joint) and the like. Further, the tap subject may not be necessarily limited to a thing capable of applying a touch input to a mobile terminal according to the present invention, and the type thereof may be different if it is a thing capable of applying an external force to the mobile terminal body 100 or object.

Further, the tap object applying such a tap may be a thing capable of applying an external force to the mobile terminal body 100 or object, for example, finger (part with a fingerprint), stylus pen, pen, pointer, first (finger joint) and the like. Further, the tap object may not be necessarily limited to a thing capable of applying a touch input to a mobile terminal according to the present invention, and the type thereof may change if it is a thing capable of applying an external force to the mobile terminal body 100 or object.

Meanwhile, an object to which a tap is applied may include at least one of the terminal body and a position out of the body. In other words, the input region of the mobile terminal may be extended to an outside of the terminal body. Accordingly, the position capable of sensing the tap at a position out of the terminal body becomes a virtual input region.

The virtual input region may vary in the area according to a location or object on which the terminal is placed or the strength of a tap. For example, when the terminal is placed on a table, the movement of the terminal may be generated if the user hits the table, thereby sensing the tap therethrough. As a result, the virtual input region is increased as increasing the strength of the hitting. In another example, when the user holds the terminal body, the virtual input region may disappear.

Meanwhile, during the process of sensing a tap, it may be determined that "knock knock" for the purpose of controlling the mobile terminal is sensed only when at least two or more taps are applied within a limited period of time. For example, when a tap is applied once to the 151 by a touch object capable of applying a touch to the display unit 151, the controller 180 can recognize the one tap as a touch input. Namely, in the locked state, inputting a control command by a user is limited, and thus, when a user input is recognized as a touch input, rather than a tap, the controller 180 can disregard the user input.

Thus, when two or more taps (or a plurality of taps) are continuously applied within a limited period of time, the controller 180 can determine that touch inputs for unlocking have been applied.

Hereinafter, consecutively sensing at least two or more taps within a limited period of time may be referred to as "knock knock." For example, when a second tap is sensed within a limited period of time from a time point at which a first tap is sensed, it may be determined that "knock knock" is sensed. Accordingly, hereinafter, sensing "knock knock" may denote that hitting an object on the terminal body or at a position out of the body is substantially sensed a plural number of times.

Meanwhile, when the sensing unit 140 is a touch sensor, the sensing unit may sense "knock knock" in a different manner according to whether the display unit 151 is activated. For example, when the display unit 151 is activated, it may need to immediately react with a user input, and thus, the touch sensor may execute an active mode in which the touch sensor is maintained in an activate state (including when the touch sensor is switched between an activated state and a deactivated state at a fast cycle over which the touch sensor is regarded as being substantially activated).

In addition, when the display unit 151 is deactivated, in order to reduce battery consumption, the touch sensor may execute a doze or sleep mode in which the touch sensor is switched between an activated state and a deactivated state on a pre-set cycle. Namely, when the display unit 151 is deactivated, the touch sensor may execute the doze or sleep mode and may be activated on every pre-set cycle.

Further, in an embodiment of the present invention, as a cycle on which the touch sensor is activated is shorter, a speed at which "knock knock" applied to the display unit 151 is sensed is increased but power consumed by the touch sensor is increased. Conversely, as the cycle on which the touch sensor is activated is longer, power consumed by the sensing unit 140 is reduced but a speed at which a touch applied to the display unit 151 is decreased.

Thus, the pre-set cycle may be set such that sensing a touch applied to the display unit 151 is so fast that that the user cannot recognize it, while efficiency of power consumption is high. For example, the pre-set cycle may be set such that the touch sensor is activated 30 times (30 Hz) per second. This may be a lowest current level at which a touch may be recognized in a state in which the display unit 151 is deactivated.

Meanwhile, the touch sensor can execute the doze or sleep mode when the display unit 151 is deactivated, and when a first tap is applied to the display unit 151, the touch sensor may execute the active mode. Namely, when it is determined that a tap is applied when the display unit 151 is deactivated, the touch sensor can execute an active mode in order to accurately sense a tap to be applied thereafter. For example, the touch sensor may be set to be activated 120 times per second when the active mode is executed.

Further, when a second tap is not sensed within a predetermined period of time from a point at which the first tap has been applied, the controller 180 can switch the touch sensor from the active mode to the doze or sleep mode. This is to prevent malfunction of the mobile terminal because a tap not intended by the user has been generated.

In addition, the sensing unit 140 may further include at least one of an accelerometer for sensing a tap using a movement of the terminal body, a sound sensor for sensing a tap using a sound generated around the terminal body, a proximity sensor for sensing a tap based on the presence and absence of an object positioned around the terminal body, and a pressure sensor for sensing a tap using pressure applied to the terminal body.

Like the touch sensor, the other sensors included in the sensing unit 140 may be deactivated when the display unit 151 is in a deactivated state, or may be activated at every pre-set period. This is to reduce power consumption caused by the sensors.

Namely, when a first tap is sensed when the display unit 151 is deactivated, the controller 180 can activate one or more sensors included in the sensing unit 140 in order to more accurately sense a second tap to be applied thereafter. The one or more sensors may include a touch sensor, a microphone sensor, a proximity sensor, an RGB sensor, a pressure sensor, and the like, and may be used to distinguish the characteristics of taps (for example, strength of a tap, a position of a tap, a time interval between a first tap and a second tap, an object of a tap, an area of a tap, and the like).

For example, the touch sensor may be disposed in the terminal body to sense a tap using a touch generated on the terminal body. Also, the touch sensor may calculate a position to which a tap is applied, and may identify an object (for example, a finger, a finger nail, a palm, and the like) of a tap using an area touched by a tap.

In another example, the microphone sensor may sense a tap using a sound generated around the terminal body. Also, since a sound has unique frequency characteristics, an object (for example, a finger, a finger nail, a palm, a pen, or the like) of a tap, a pattern of a tap, or the like, may be identified using frequency characteristics of received voice information.

In another example, even when "knock knock" is sensed by the touch sensor, if an object adjacent to a front side of the terminal body is detected by the proximity sensor, the controller 180 can reject the "knock knock." This is because the mobile terminal 100 held in a bag may be malfunction due to the bag moving.

In another example, the RGB sensor may sense a color of a tap object, and identify a type of the object using the sensed color. Namely, a finger and a touch pen may be distinguished by the RGB sensor. In still another example, the pressure sensor may sense a tap using pressure applied to the terminal body, and calculate strength of the pressure generated by the tap.

In another example, a piezo sensor (or an impact sensor) using a nature that electricity is generated from a surface of a crystal when pressure is applied thereto in a particular direction, may sense a tap. Compared to an accelerometer that senses a movement corresponding to hundreds of hertz (Hz), the piezo sensor may sense a movement corresponding to thousands of hertz (kHz), and thus, the piezo sensor may sense a movement (or an impact) of the mobile terminal more accurately.

In addition, the controller 180 can recognize characteristics of the foregoing tap using the piezo sensor. In more detail, since different physical patterns are generated according to the characteristics of taps generating impact on an object, the piezo sensor may recognize characteristics of a tap using an experimentally obtained physical pattern. The experimentally obtained physical pattern may be set when mobile terminals are released, and stored in the memory 160. The physical pattern may be periodically updated or changed by the user.

Further, in the mobile terminal according to an embodiment of the present invention, in order to sense a tap applied to the body of the mobile terminal, either the accelerometer or the touch sensor may be used, the accelerometer and the touch sensor may be sequentially used, or both the accelerometer and the touch sensor may be used simultaneously.

Meanwhile, the mode in which only the accelerometer is used may be referred to as a first mode, a mode in which only the touch sensor is used may be referred to as a second mode, and a mode in which both the accelerometer and the touch sensor are utilized (simultaneously or sequentially) may be referred to as a third mode or a hybrid mode. In addition, the controller 180 can determine whether "knock knock" is sensed in consideration of sensing signals generated by the forgoing sensors collectively. By doing that, the controller 18 can more accurately recognize the characteristics of a tap, such as a position where a tap is sensed, or the like.

Next, the controller 180 determines whether the sensed touch inputs are matched to a pre-set pattern in step S730. When "knock knock" applied to the display unit a plurality of times is sensed, the controller 180 can analyze an operation pattern of the user formed by sequentially connecting touch points of the sensed touch inputs.

The operation pattern may variously applied according to the number of sensed touch inputs, an absolute or relative position to which the touch inputs were applied, an input speed (or a beat) of the touch inputs, order in which the touch inputs have been applied, the number of touches included in a single touch input (for example, a touch input by one finger or a touch input by two fingers), an area to which the touch inputs have been applied, strength of the touch inputs, whether the touch inputs are maintained to be in contact with the terminal body) (tap and hold), and the like.

In an embodiment, the controller 180 can determine whether the sensed touch inputs have been sequentially applied to at least one region according to a pre-set pattern among virtual regions of the display unit divided into the virtual regions based on pre-set order. For example, the virtual regions may include first, second, third, and fourth virtual regions, and the first, second, third, and fourth virtual regions may correspond to different numbers, respectively, and the different numbers may be given in order from the left to the right or from top to bottom based on the positions of the first, second, third, and fourth regions.

In this instance, when the sensed touch inputs have been sequentially applied to at least one of the first, second, third, and fourth regions according to a pre-set pattern based on pre-set order, the controller 180 can determine that the touch inputs are matched to the pre-set pattern.

In another embodiment, the controller 180 can calculate position coordinates to which a touch input has been applied. Position coordinates may be expressed as coordinates (x,y) based on a horizontal axis (x axis) and a vertical axis (y axis) of the display unit. The controller 180 can analyze an operation pattern of the user formed by sequentially connecting touch points based on the calculated position coordinates. The controller 180 can differentiate between an operation pattern for unlocking and an operation pattern unrelated to unlocking.

The controller 180 can analyze an operation pattern based on relative positions of touch points. In this instance, an nth touch input needs to be applied to a position satisfying a pre-set condition from a point to which an (n−1)th touch input has been applied. For example, when a second touch input does not satisfy a pre-set condition in relation to the first touch input, the controller 180 disregards the first touch input.

Further, when the second touch satisfy the pre-set condition in relation to the first touch input, the controller 180 determines whether a third touch input satisfies the pre-set condition in relation to the second touch input. When all of the touch inputs constituting the operation pattern satisfy the pre-set condition, the controller 180 can determine that the pre-set pattern has been sensed. The pre-set condition may relate to a distance between two touch points, a direction of the two touch points, and an angle between a virtual reference axis based on a vertical axis of the terminal body and straight lines linking two points.

Referring again to FIG. 7, when the sensed touch inputs are matched to the pre-set pattern (Yes in S730), the controller 180 releases the locked state and switches the display unit in a deactivated state to an activated state in step S750. Namely, the controller 180 executes an unlocking function.

The controller 180 analyzes the operation pattern based on the sensed touch inputs and determines whether the analyzed operation pattern (or a pre-set pattern) is matched to an operation pattern (or a pre-set pattern0 defined as a release command. The controller 180 can digitize a matching rate, and when the digitized matching rate is greater than a reference value, the controller 180 can determine that the operation pattern is matched to the pre-set pattern.

Thereafter, the controller determines whether characteristics of the sensed touch inputs are identical to any one of pre-set characteristics in step S770. In more detail, the controller 180 can compare the characteristics of the sensed touch input with characteristics set as a shortcut function to determine whether they are identical.

The sensed touch inputs may be sensed to have various sizes at various positions corresponding to at least one region of the display region of the display unit. The sensed touch inputs may be input by various objects such as a finger, a finger in a glove, a touch pen, or the like. Namely, the sensed touch inputs may be matched to the pre-set pattern and may have various characteristics.

In more detail, the characteristics of the sensed touch inputs may be varied according to at least one of a position of a region to which the sensed touch inputs have been applied, a size of the region to which the sensed touch inputs have been applied, a type of object which has applied the sensed touch inputs, and the number of touches included in a final touch input among the sensed touch inputs.

For example, when the sensed touch inputs are matched to the pre-set pattern and have first characteristics, the controller 180 can release a locked state and display a first execution screen on the display unit, and when the sensed touch inputs are matched to the pre-set pattern and have second characteristics different from the first characteristics, the controller 180 can release the locked state and display a second execution screen different from the first execution screen on the display unit.

The sensed touch inputs may be matched to the pre-set pattern. Here, however, when there are no pre-set characteristics or when the sensed touch inputs are not identical to the pre-set characteristics (No in S770), the controller 180 displays a home screen or the last execution screen when unlocking in step S790. The home screen may include at least one object, and the object may be an icon or a widget of an application installed in the mobile terminal.

Further, when the sensed touch inputs are matched to the pre-set pattern and identical to any one of pre-set characteristics (Yes in S770), an execution screen corresponding to the any one pre-set characteristics is displayed in step S792. The memory unit 160 stores the pre-set characteristics and information regarding an execution screen corresponding to the pre-set characteristics, and thus, the controller 180 can display an execution screen corresponding to the characteristics of the sensed touch inputs on the display unit.

In this instance, the controller 180 executes one or more control functions related to the execution screen such that the execution screen is displayed on the display unit 151. Here, the control functions may refer to any type of function that can be executed or driven in the mobile terminal 100. For example, one of the control functions may be an application installed in the mobile terminal 100. For example, "execution of a certain function" may refer to "execution or driving of a certain application."

In another example, a function executable in the mobile terminal 100 may be a function generating an event. Here, the generated event may be a message origination event, a call origination event, or the like. Meanwhile, the event may be an event generated from an application installed in the mobile terminal.

In another example, a function executable in the mobile terminal 100 may be a function required for basic driving of the mobile terminal 100. For example, the function required for basic driving may be a function of turning on or off Wi-Fi, a function of setting a communication network, a function of changing configuration information of the mobile terminal 100, or the like.

Namely, by applying a plurality of touch inputs to the display unit 151 in a deactivated state, the user may release a locked state and simultaneously execute a function desired to be executed. Meanwhile, when the display unit is deactivated, guide information for receiving a touch corresponding to the pre-set pattern is not output.

The pre-set characteristics will be described in detail. When sensed touch inputs are matched to the pre-set pattern, the controller 180 selectively displays at least one execution screen based on at least one of a position and a size of a region to which the sensed touch inputs have been applied, among the plurality of pre-set execution screens. For example, when a plurality of touch inputs matched to the pre-set pattern are sensed in a first pre-set region of the display region of the display unit, the controller 180 can release the locked state, simultaneously execute a function corresponding to the positional characteristics of the first region, and display an execution screen according to the execution on the display unit 151. Further, when a plurality of touch inputs matched to the pre-set pattern are sensed in a region different from the first region, the controller 180 can display a home screen or an execution screen of the last executed application.

The controller 180 can divide the display unit 151 into a plurality of regions, and set the plurality of regions to correspond to different execution screens, respectively. For example, when an entire region of the display unit is divided into an upper region and a lower region, the controller 180 can set a first execution screen in the upper region and a second execution screen in the lower region. To conclude, when a plurality of touch inputs matched to the pre-set pattern are input to the upper region, a locked state of the mobile terminal is released and the first execution screen is displayed.

The plurality of regions as described above may be formed to have various shapes according to a user setting. As described above, the display unit 151 may be divided into upper and lower execution regions or may be divided into first to fourth execution regions. Also, execution screens corresponding to the regions may be variously modified according to a user setting.

In addition, the pre-set characteristics may relate to the number of touches included in a final touch input among the sensed touch inputs. For example, when a touch input is applied by one finger, the number of touches included in a final touch input is one, and when a touch input is applied by two fingers, the number of touches included in the final touch input is two. The controller 180 can display different execution screens according to the number of touches included in the final touch input.

Also, the pre-set characteristics may relate to a type of object which has applied the sensed touch inputs. The controller 180 can identify a type of an object which has applied a touch input using a touched area, a sound generated when a touch is applied, or the like. For example, the controller 180 can determine whether the sensed touch inputs have been applied by a finger, a touch pen, or a gloved hand. Based on a type of the object, the controller 180 can select an execution screen to be displayed on the display unit from among a plurality of pre-set execution screens when a locked state is released.

Meanwhile, the mobile terminal according to an embodiment of the present invention may provide a multi-user function. Here, the multi-user function refers to a function allowing multiple users to log into a single mobile terminal through different accounts and use different settings for each account. Home screen settings, sound settings, executable app settings, folder settings, and the like, may be differently set in each account. Namely, different home screens may be set for multiple users.

Here, when the sensed touch inputs are matched to a pre-set pattern, the controller 180 can release a locked state, log in for any one of the multiple users based on characteristics of the sensed touch inputs, and display a home screen corresponding to the any one user. For example, when the sensed touch inputs have first characteristics, the controller 180 can display a first home screen corresponding to a first user, and when the sensed touch inputs have second characteristics, the controller 180 can display a second home screen corresponding to a second user.

Further, when the sensed touch inputs are matched to the pre-set pattern, a final touch input among the touch inputs constituting the sensed touch inputs may not be released but maintained in a contact state. When the final touch input is maintained, rather than being released for a pre-set period of time, the controller 180 can display graphic objects corresponding to different functions around the position where the final touch input has been sensed. Thereafter, when a drag input, starting from a touch corresponding to the final touch input, to reach any one of the graphic objects is sensed, the controller 180 can processes a function corresponding to the any one graphic object.

Types of graphic objects displayed around the position where the final touch input has been sensed may vary according to characteristics of the sensed touch inputs. In more detail, types of the graphic objects may be varied by at least one of a position of a region to which the sensed touch inputs have been applied, a size of the region to which the sensed touch inputs have been applied, a type of an object used to apply the sensed touch inputs, and the number of touches included in a final touch input among the sensed touch inputs.

For example, the sensed touch inputs may be matched to a pre-set pattern, the number of touches included in the final touch input among the sensed touch inputs may be one, and the final touch input may be maintained for a pre-set period of time, rather than being released. In such a case, the controller 180 can display icons fixed at the same positions around the final touch input, although a page is shifted in the home screen composed of a plurality of pages. In this instance, the icons are formed to execute different applications.

In another example, the sensed touch inputs may be matched to a pre-set pattern, the number of touches included in a final touch input among the sensed touch inputs may be two, and the final touch input may be maintained for a pre-set period of time, rather than being released. In such a case, the graphic objects may include icons formed to perform a function of making a call to a particular contact number. The particular contact number may be a contact number set by the user as bookmark or may be a contact number included in the recent call list.

In addition, although a plurality of touch inputs applied to the display unit 151 are sensed when the display unit 151 is deactivated, a pattern formed by the sensed touch inputs may not be matched to a pre-set pattern for unlocking. Namely, touch inputs unrelated to unlocking (or an erroneous operation pattern) may be sensed. In this instance, the controller 180 can not release the locked state and maintain the display unit 151 in the deactivated state. Namely, the controller 180 ignores the sensed touch inputs. In this instance, however, in order to inform the user that tapping has been erroneously applied, the controller 180 can inform the user that there is no executable function (or that a tap pattern has been erroneously input) using a light emitting unit.

Meanwhile, the erroneous operation pattern may be continuously sensed. Namely, taps unrelated to unlocking may be repeatedly sensed by a reference number of times within a reference period of time. In such a case, the controller 180 can maintain the locked state but activate the display unit 151 and display a locked screen formed to receive a password. When the erroneous operation pattern is repeatedly input, it means that the user has a wrong password, and thus, the controller 180 displays a locked screen that may be unlocked on the display unit 151. Thereafter, the user can input a password using a virtual keypad of the locked screen and switch the locked state to a released state.

Next, FIGS. 8A through 11 are conceptual views illustrating an example of operations implemented by the control method of FIG. 7, in which controlling is performed using a plurality of touch inputs applied to a deactivated display unit.

Figure 8A:
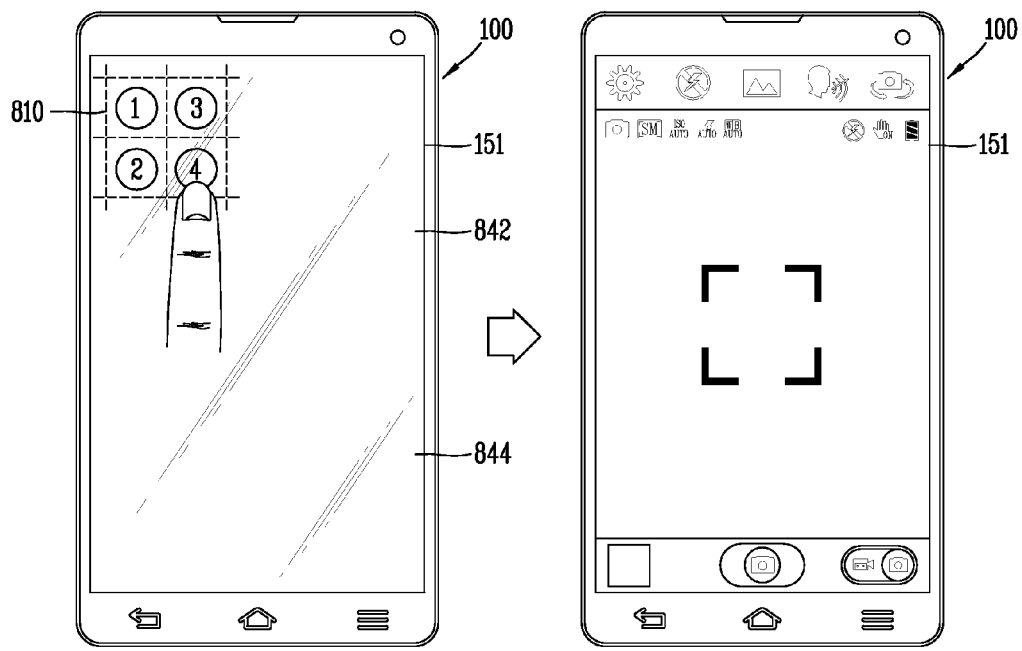
FIGS. 8A through 11B are conceptual views illustrating an example of operations implemented by the control method of FIG. 7, in which controlling is performed using a plurality of touch inputs applied to a deactivated display unit.
Figure 8B:
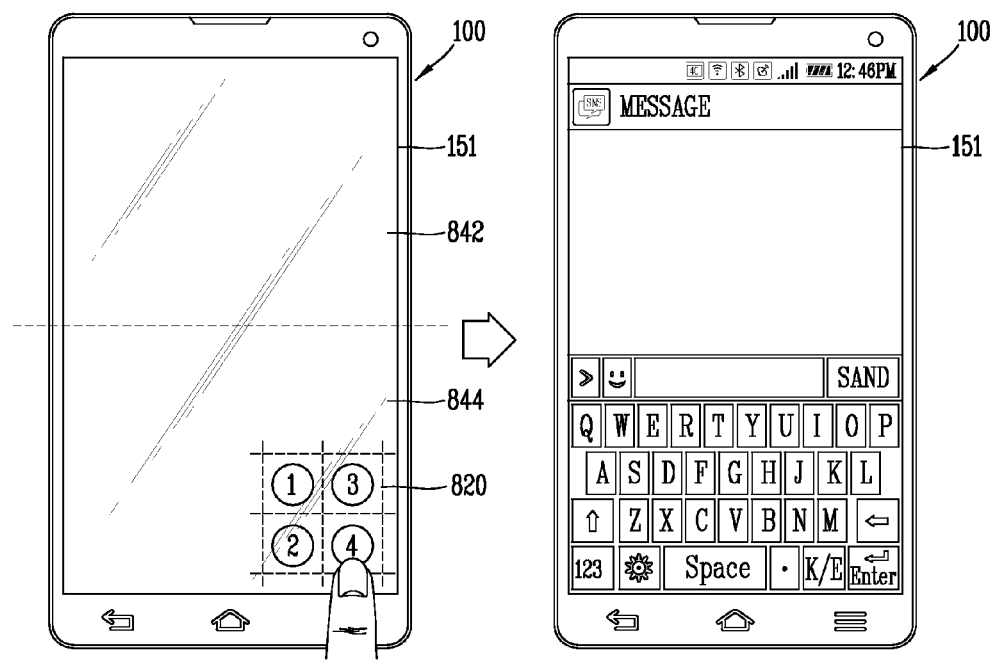
Figure 8C:
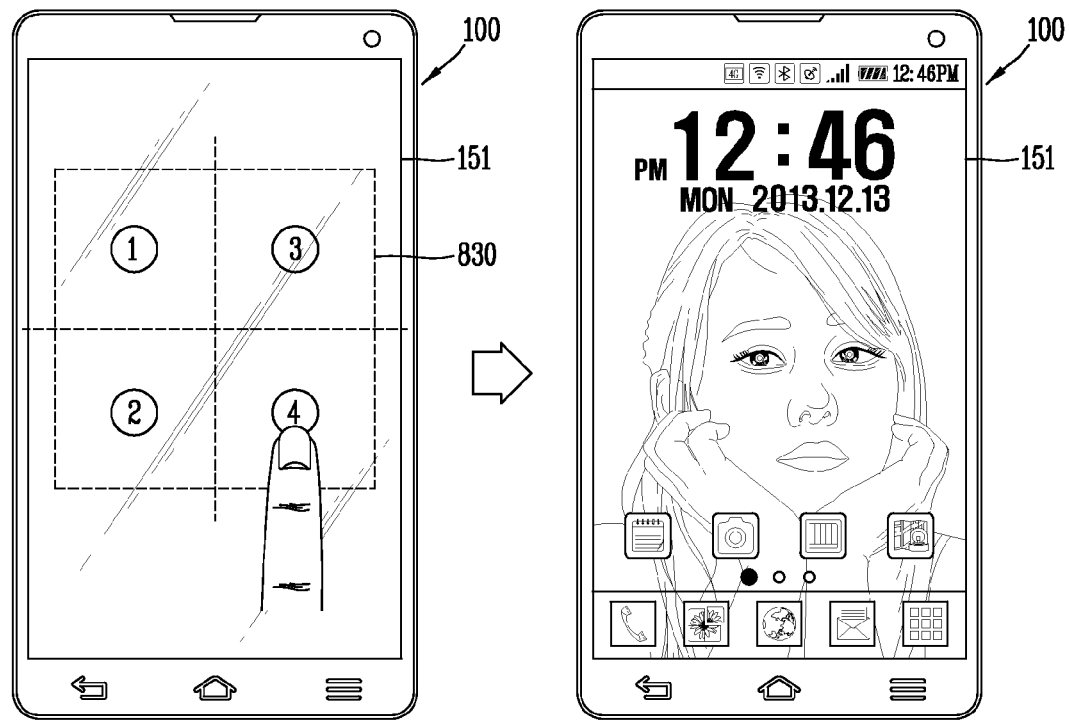

Referring to FIGS. 8A through 8C, for example, when a locked state is released, screen information displayed on the display unit 151 is varied based on at least one of a position and a size of a region to which sensed touch inputs have been applied.

In more detail, referring to FIGS. 8A through 8C, when the display unit 151 is deactivated, the sensing unit 140 senses a plurality of touch inputs applied to the display unit 151. In this instance, the controller 180 can extract regions 810, 820, and 830 to which the plurality of touch inputs have been applied. The dividing lines demarcating the regions to which the touch inputs have been applied are virtual lines, which are not actually display on the display unit 151 of the mobile terminal 100. When the display unit 151 is deactivated, information related to a plurality of regions may not be output, while virtual lines demarcating virtual regions and numbers respectively denoting the virtual regions are illustrated on the drawings for the purposes of description.

The display unit 151 is divided into virtual regions, and at least one of a position and a size of the virtual regions is varied based on a touch point where the plurality of touch inputs are sensed in the display unit 151. For example, in the drawings, it is illustrated that virtual regions include first, second, third, and fourth virtual regions, and at least one of the position and size of the virtual regions is varied according to a position where the first, second, third, and fourth touch inputs sequentially applied to the display unit are sensed.

The first, second, third, and fourth regions correspond to different numbers, respectively. For example, the different numbers may be given in order from the left to the right or from the top to the bottom based on the positions of the first, second, third, and fourth regions.

The controller 180 determines whether the sensed touch inputs include a plurality of touch inputs sequentially applied to at least one of the first, second, third, and fourth regions in pre-set order according to a pre-set pattern. For example, as illustrated in FIG. 6A, when first to fourth touch inputs ①, ②, ③ and ④ are sequentially sensed in a first virtual region→third virtual region→second virtual region-→fourth virtual region, the controller 180 can determine that a plurality of touch inputs matched to the pre-set pattern are sensed.

Thereafter, in releasing a locked state, the controller 180 can select an execution screen to be displayed on the display unit 151 switched to an activated state according to characteristics of the sensed touch inputs. In more detail, the display unit 151 may be divided into a plurality of regions respectively corresponding to different execution screens in the deactivated state, and the controller 180 displays an execution screen corresponding to any one of the regions to which the sensed touch inputs have been applied.

For example, the display unit 151 may be divided into an upper region 842 and a lower region 844. The upper region 842 may be set to execute a call origination function and display an execution screen according to execution of the call origination function. The lower region 844 may set to execute a messenger function and display an execution screen of the messenger function. Namely, an execution screen according to execution of a call origination function and an execution screen of a messenger application may be set in advance as a plurality of execution screens to be displayed when a locked state is released.

Subsequently, as illustrated in FIG. 8A, when a region 810 to which a plurality of touch inputs have been applied (or a region in which a knock code is sensed) is included in the upper region 842, an execution screen according to execution of a call origination function is displayed on the display unit 151. Further, as illustrated in FIG. 8B, when a region to which a plurality of touch inputs have been applied is included in the lower region 844, an execution screen of a messenger function is displayed.

Meanwhile, as illustrated in FIG. 8C, when characteristics of sensed touch inputs are not identical to pre-set characteristics (or when a plurality of touch inputs are applied to a region including the upper region and the lower region), a home screen is displayed as an execution screen.

As described above, the user of the mobile terminal according to an embodiment of the present invention can execute different functions by simply applying a plurality of touch inputs matched to a pre-set pattern to different regions of the display unit. Namely, the mobile terminal according to an embodiment of the present invention provides a more intuitive, relatively simple user interface environment to users.

Further, the mobile terminal according to an embodiment of the present invention can display different execution screens according to the number of touches included in a final touch input among a plurality of touch inputs matched to a pre-set pattern. For example, when the number of touches is one, a first execution screen matched thereto may be displayed, and when the number of touches is two, a second execution screen matched thereto may be displayed.

Figure 9A:
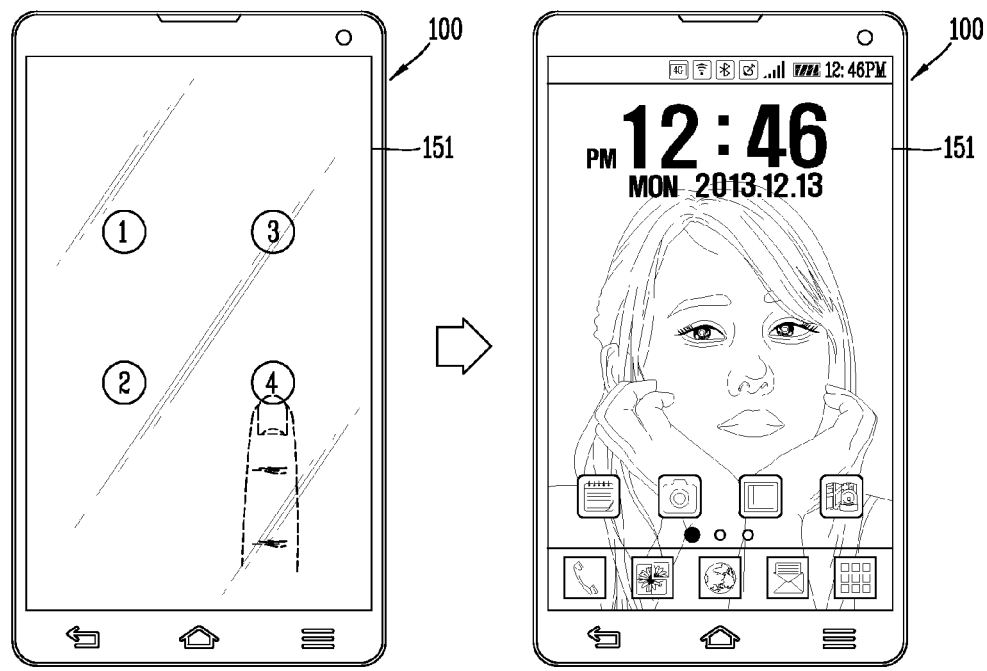
Figure 9B:
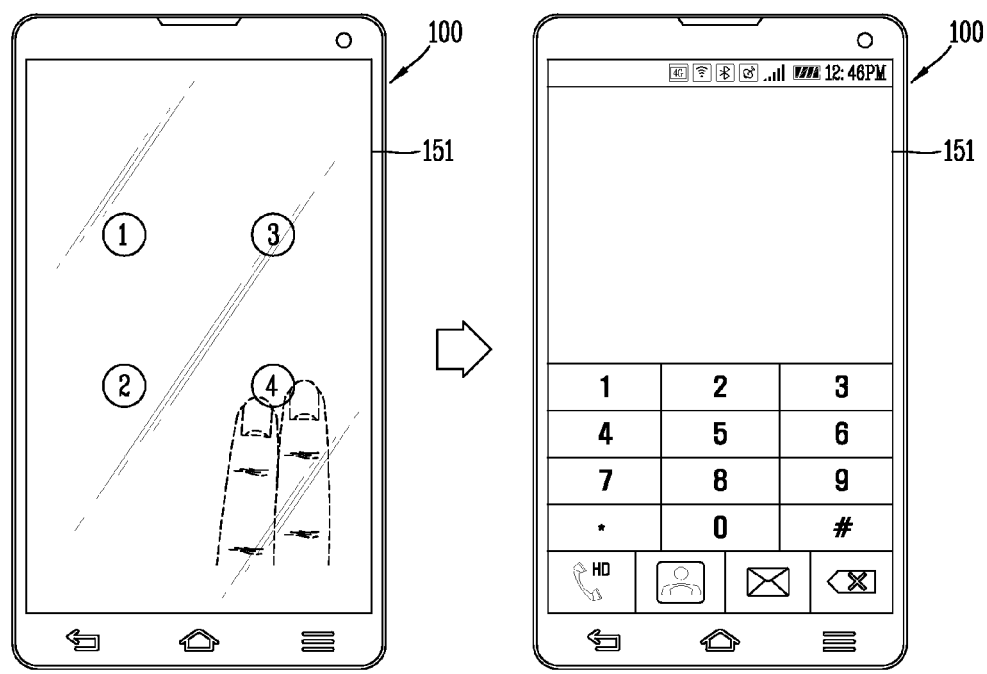

For example, when the number of touches is one, a home screen may be displayed as illustrated in FIG. 9A, while when the number of touches is two, an execution screen of a camera function may be displayed as illustrated in FIG. 9B. Also, in the mobile terminal according to an embodiment of the present invention, different execution screens may be displayed depending on types of objects used to apply a plurality of touch inputs matched to a pre-set pattern.

Figure 10A:
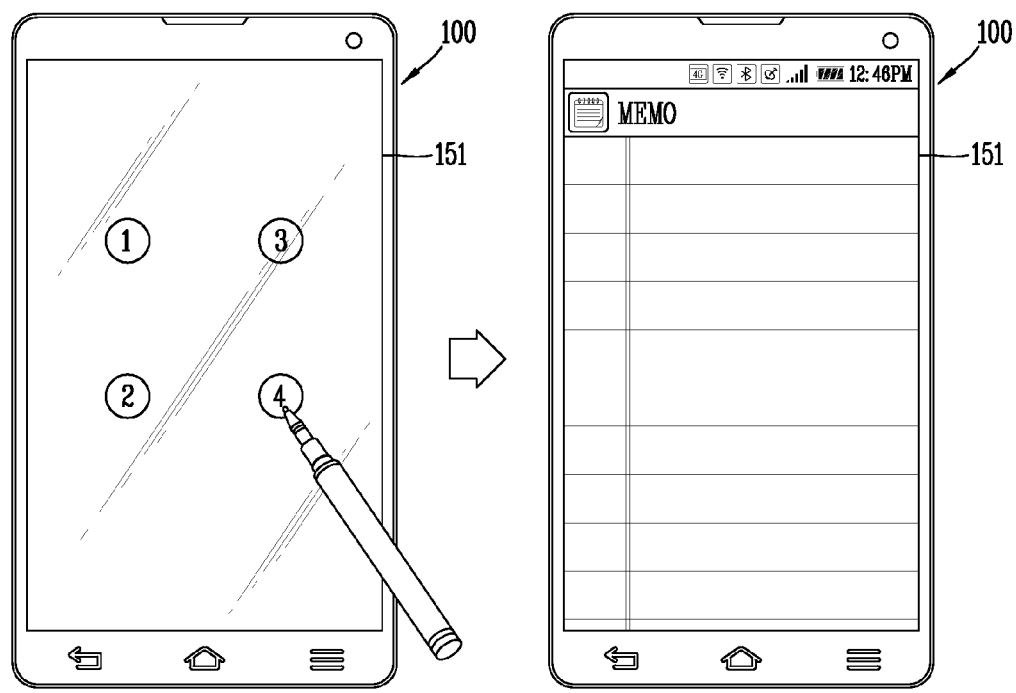

For example, as illustrated in FIG. 10A, when a pre-set pattern is applied by a touch pen, a memo function (or a memo application) is executed and an execution screen of the executed memo function may be displayed.

Figure 10B:
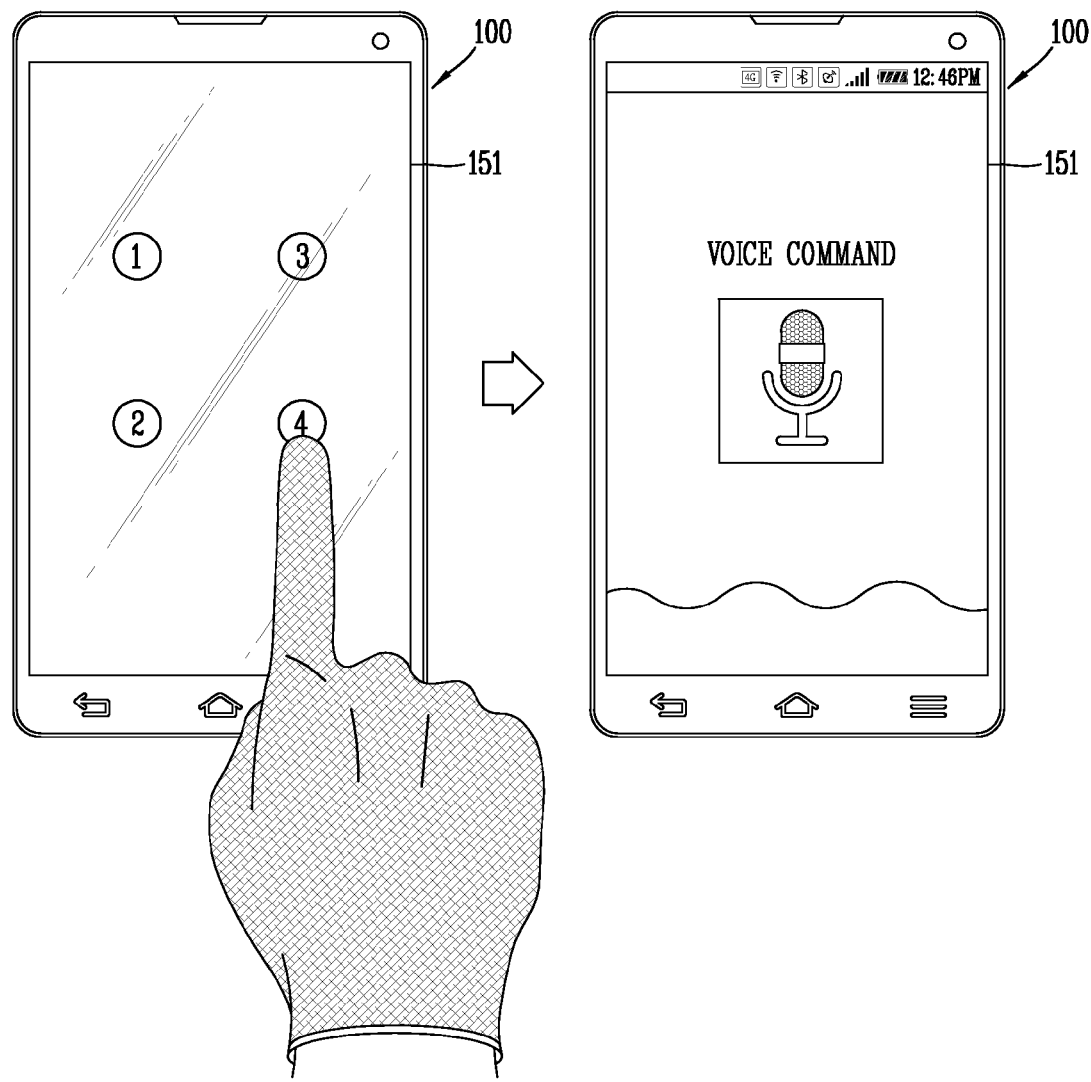

In another example, as illustrated in FIG. 10B, when a pre-set pattern is applied by a user's hand that wears gloves, a voice recognition function may be activated. Thus, in response to a voice command input from the user, the controller 180 can activate, execute, or perform a function related to the corresponding voice command. It is difficult for the user wearing the gloves to accurately apply a touch input, and thus, the user may conveniently control the mobile terminal using the voice recognition function.

Further, the controller 180 can output notification information indicating that the voice recognition function has been activated, using at least one of visual, tactile, and audible schemes. Meanwhile, when visual notification information is output, the controller 180 can activate only a portion of the display unit 151 to output the notification information thereto.

Meanwhile, the mobile terminal according to an embodiment of the present invention may provide a multi-user function. Here, the multi-user function refers to a function allowing users to log in to a single mobile terminal through different accounts and use different settings for each account.

According to the multi-user function, home screen settings, sound settings, executable app settings, folder settings, and the like, may be differently set in each account. Different home screens may be set for each of users registered as multi-users. In more detail, a background of a home screen, a disposition of icons, and the like, may be freely set by users. Accordingly, multiple users may use a single terminal according to a scheme fitting themselves.

Here, when sensed touch inputs are matched to a pre-set pattern, the controller 180 can release a locked state and perform log-in with respect to any one of the multiple users based on characteristics of the sensed touch inputs. In addition, the controller 180 can execute a log-in function with respect to various users according to at least one of a position to which touch inputs have been applied, a size of the touch inputs, the number of touches included in a final touch input, and a type of an object used to apply touch inputs. Thus, the controller 180 can display a home screen corresponding to any one of the user.

Figure 11A:
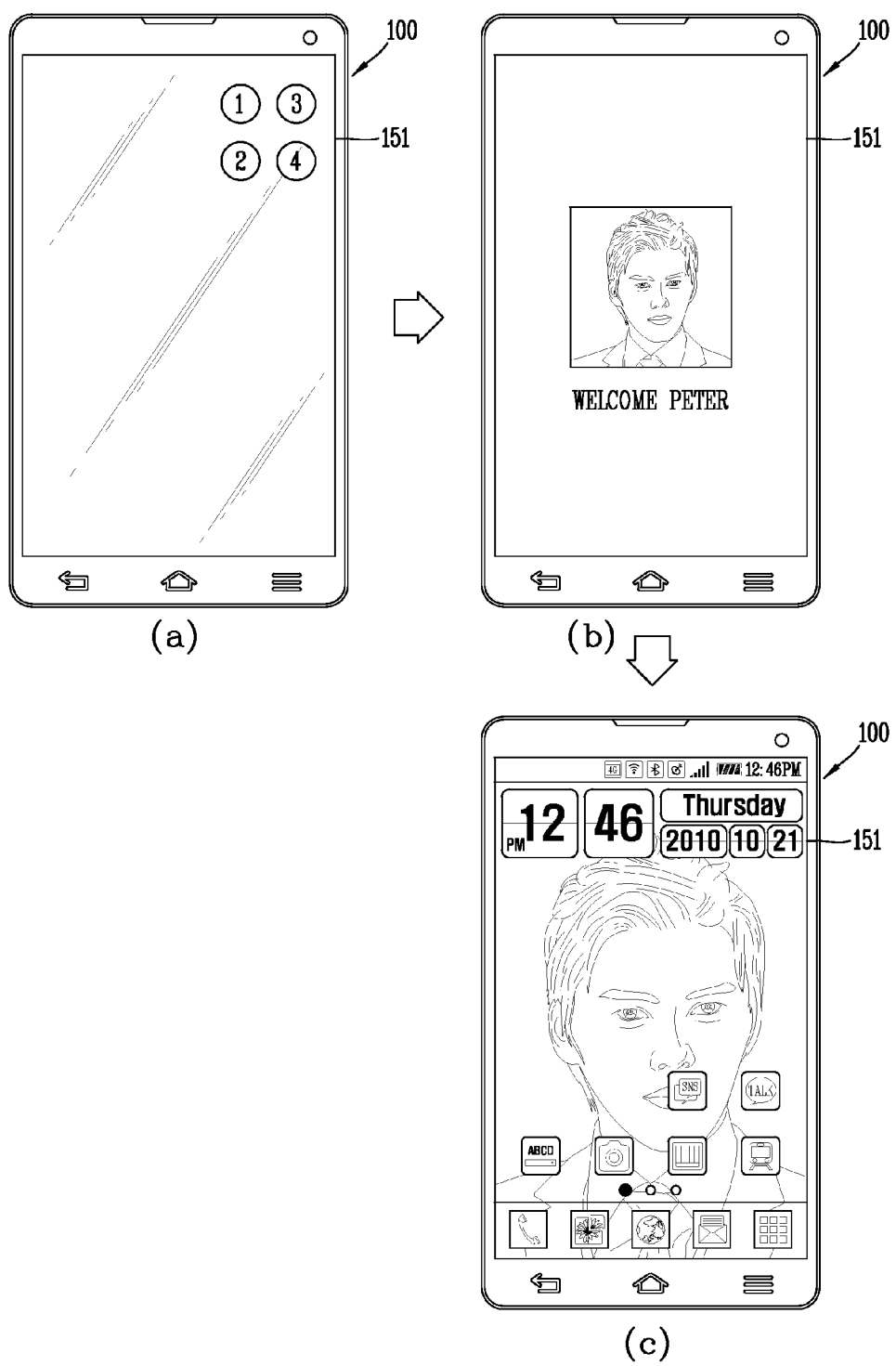
Figure 11B:
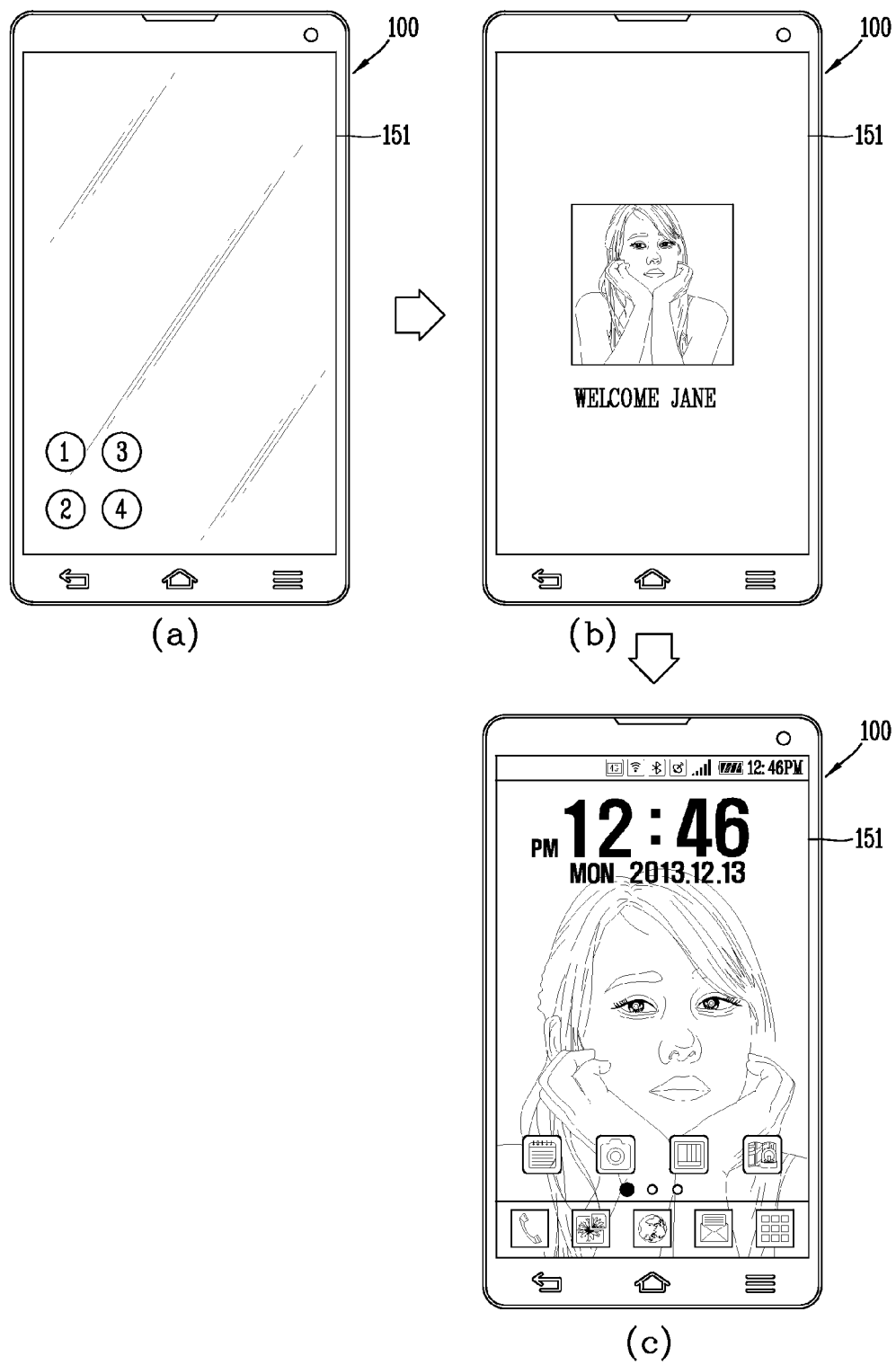

For example, as illustrated in FIG. 11A, when sensed touch inputs have first characteristics, a first home screen corresponding to a first user may be displayed. Also, as illustrated in FIG. 11B, when sensed touch inputs have second characteristics, a second home screen corresponding to a second user may be displayed.

So far, the embodiment in which various execution screens are displayed according to characteristics of sensed touch inputs when a single pattern is set in advance has been described, but a plurality of patterns may also be set in advance. Namely, a plurality of patterns for releasing a locked state may exist in the mobile terminal. The plurality of pre-set patterns may be set to display different execution screens. Hereinafter, a method of controlling a mobile terminal using a plurality of pre-set patterns will be described in detail.

FIGS. 12A through 14 are conceptual views illustrating a control method when a final tap is maintained in contact with a display unit, rather than being released, in a mobile terminal according to an embodiment of the present invention.

Figure 12A:
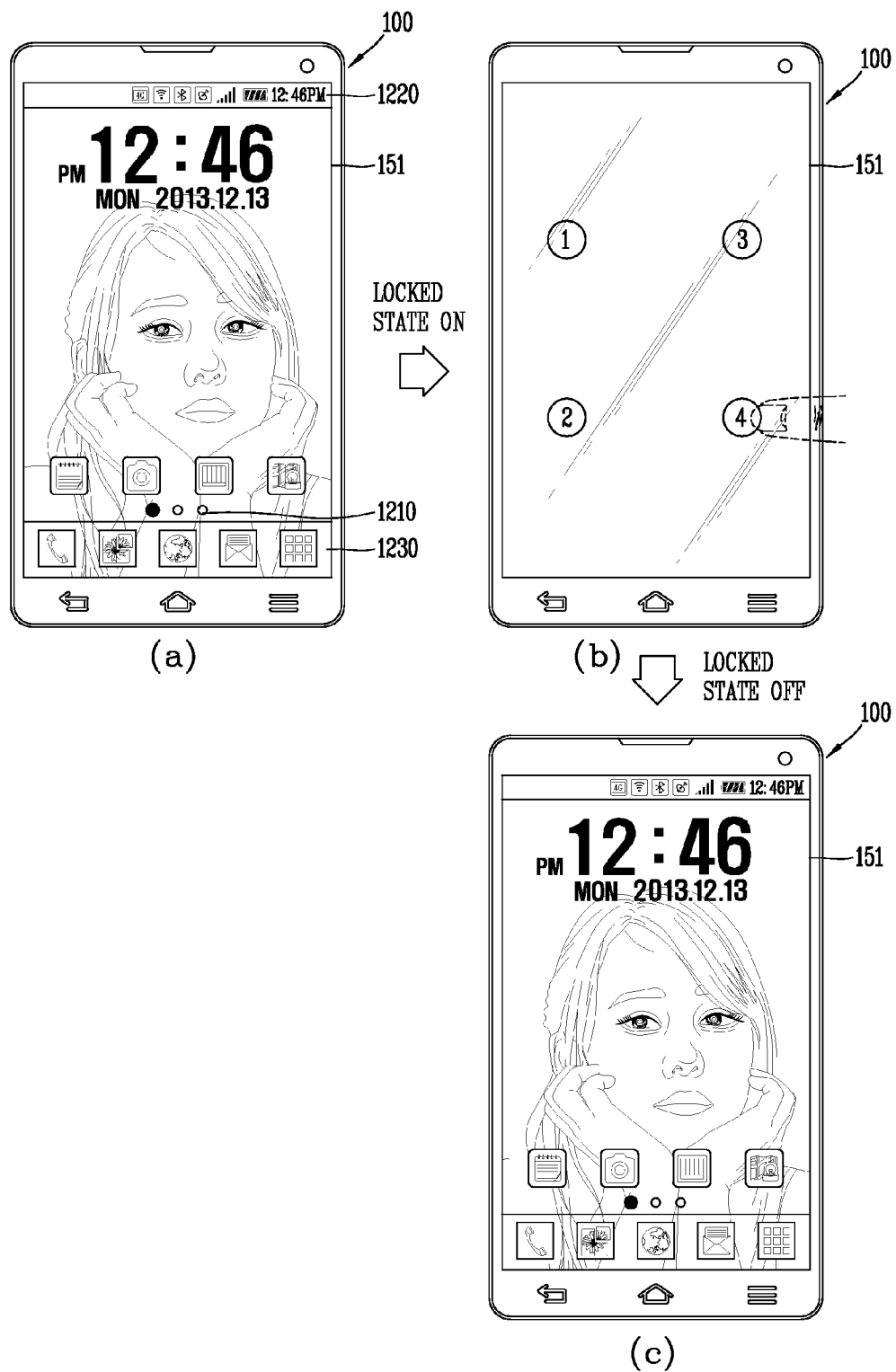
FIGS. 12A through 14 are conceptual views illustrating a control method in a case in which a final tap is maintained in contact with a display unit, rather than being released, in a mobile terminal according to an embodiment of the present invention.
Figure 12B:
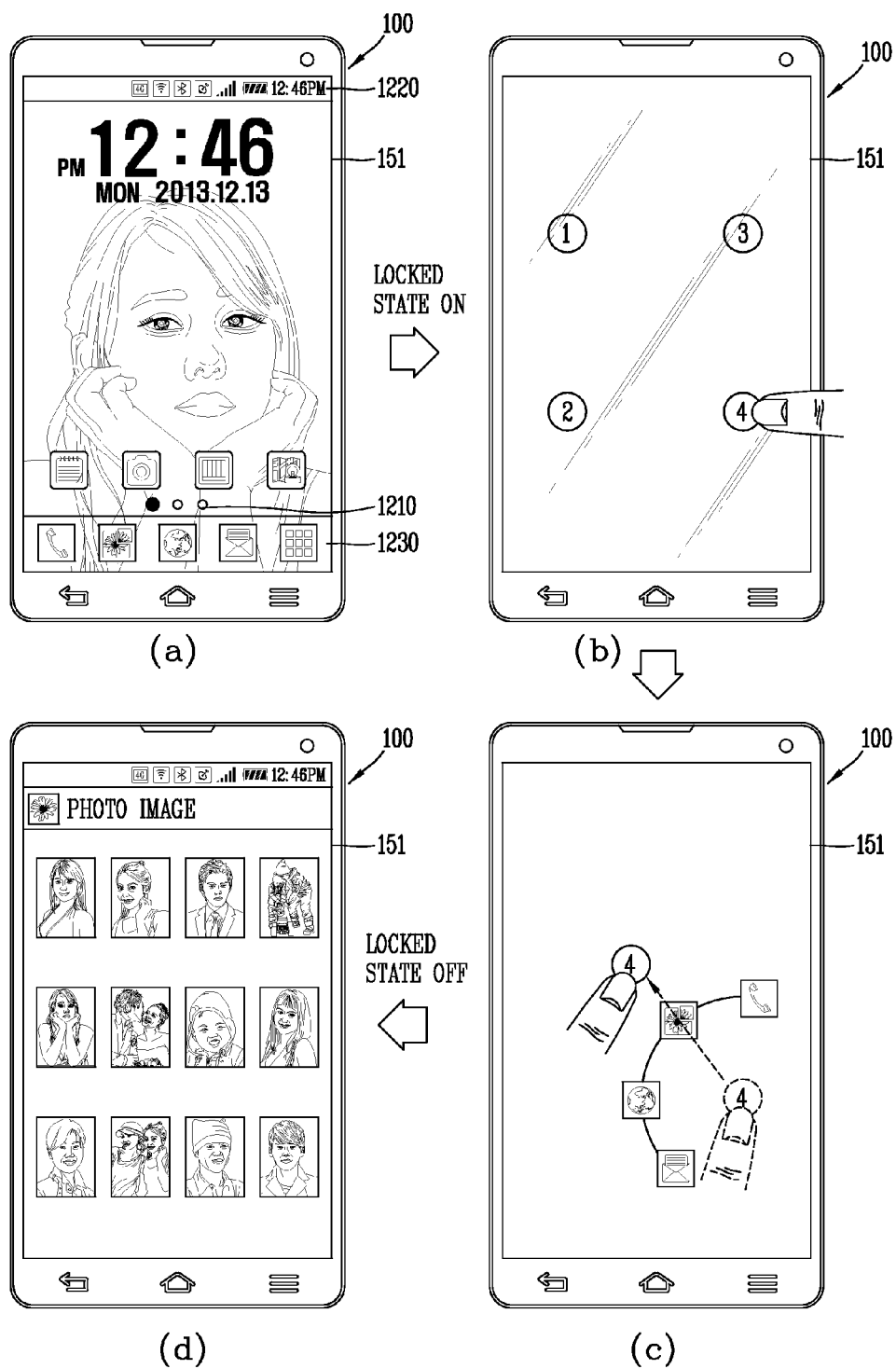
Figure 13A:
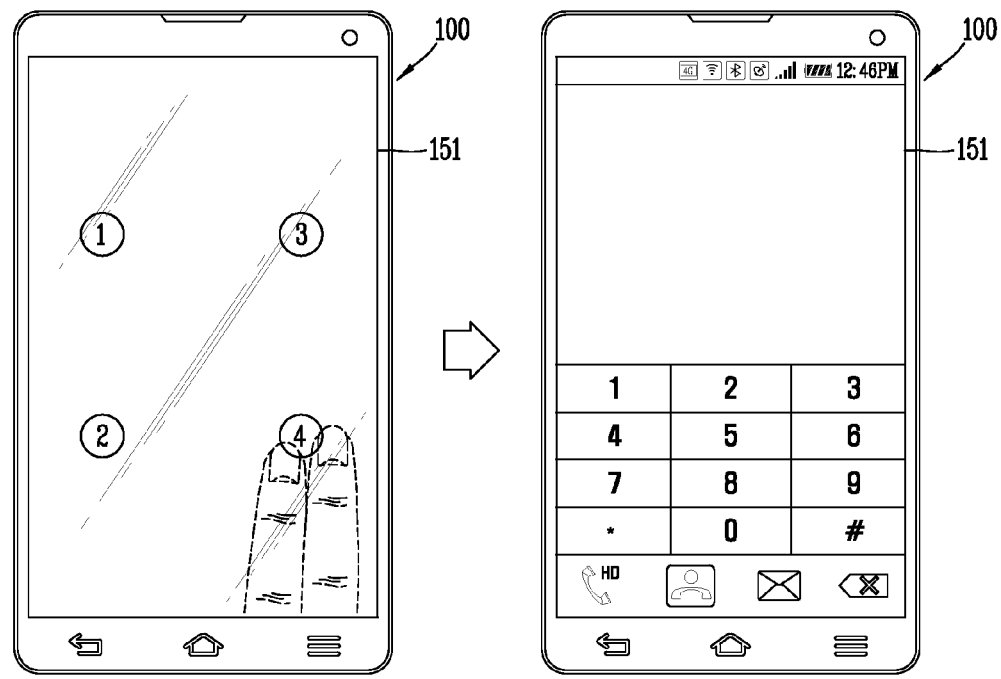
Figure 13B:
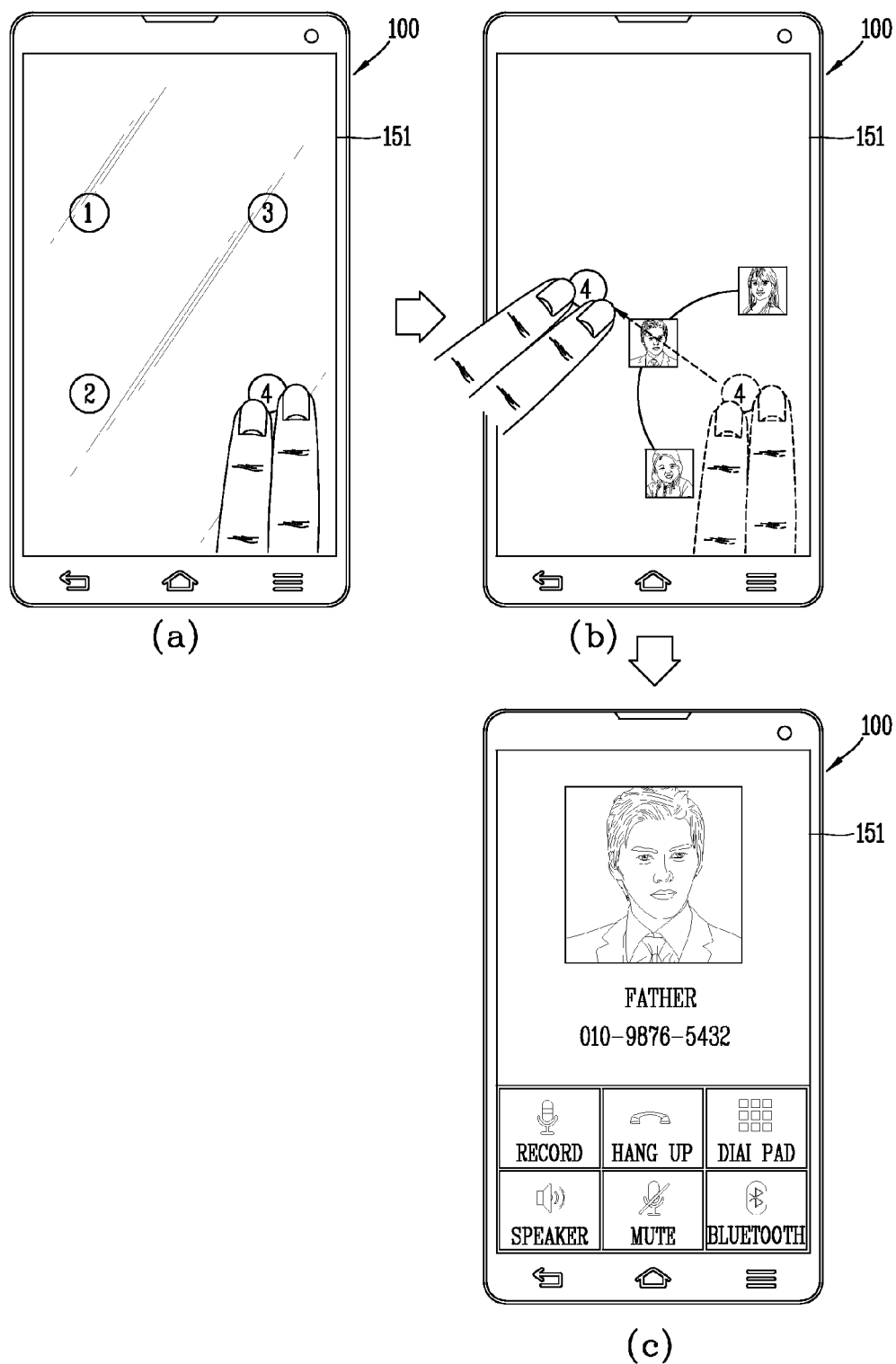
Figure 14:
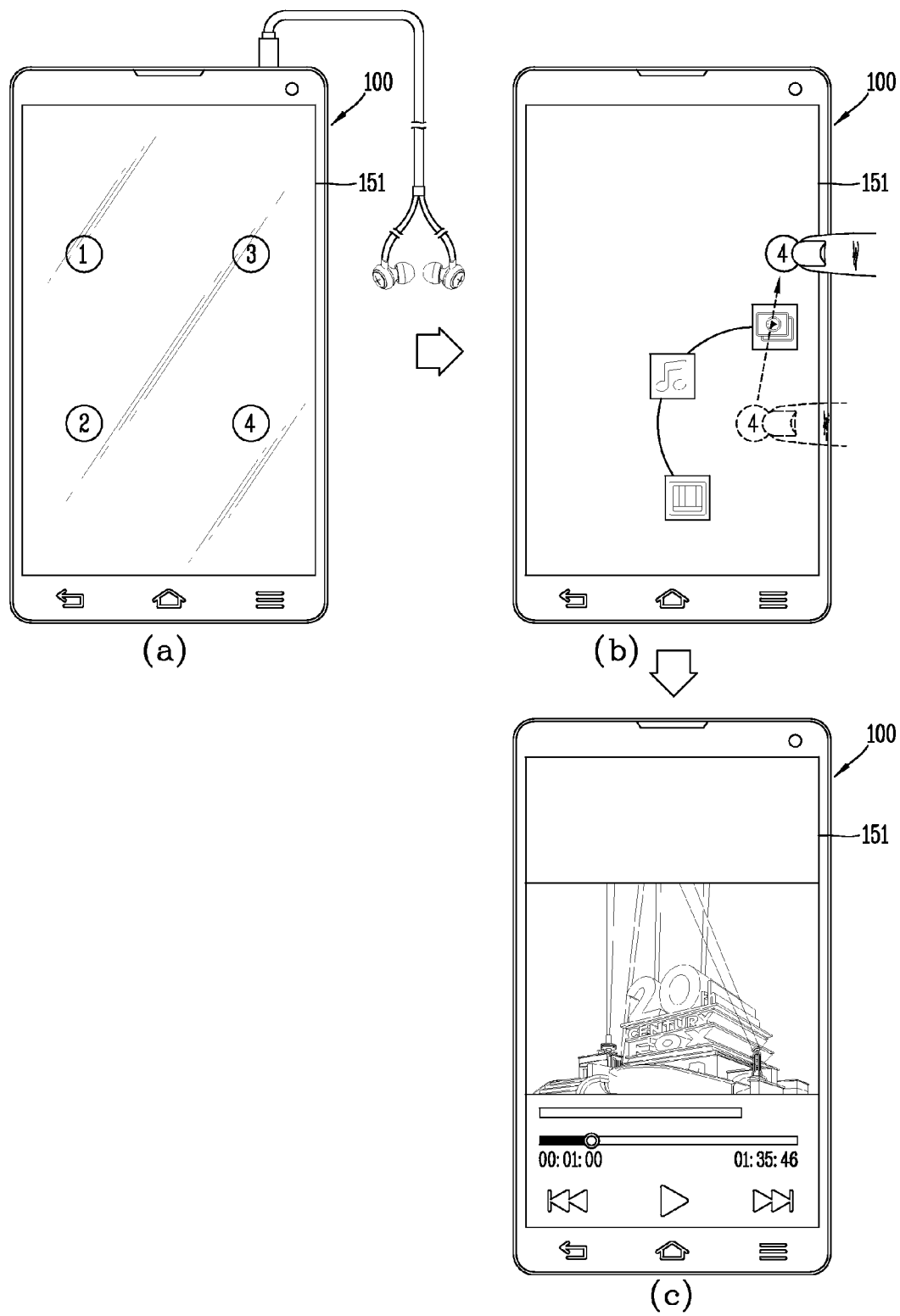

FIGS. 12A and 12B are conceptual views illustrating a knock code applied by one finger in a mobile terminal according to an embodiment of the present invention, FIGS. 13A and 13B are conceptual views illustrating a case in which a knock code is applied by one finger in a mobile terminal according to an embodiment of the present invention, and FIG. 14 is a conceptual view illustrating a case in which a knock code is applied with an earphone installed.

Referring to (a) of FIG. 12A, the controller 180 can display a home screen on the display unit 151. The home screen may also be referred to as an idle screen. The home screen may be displayed on the display unit 151 when the mobile terminal 100 is on standby.

The home screen will be described in detail. The home screen may include at least one object, and the at least one object may be an icon or a widget of an application installed in the mobile terminal. Meanwhile, the home screen may include a plurality of pages according to a user selection or the number of applications installed in the mobile terminal, and at least one of the plurality of pages may be output to the display unit 151 according to a user selection.

The home screen may also include at least one of an identification information region 1210 in which identification information with respect to a page output to the display unit 151 is displayed, a state information region 1220 in which state information of the mobile terminal 100 is displayed, and a pre-set region 1230 in which icons or pre-set applications are displayed. Identification information indicating how many pages to a plurality of pages the currently output page is may be output to the identification information region 1210.

Also, at least one of antenna information of the mobile terminal 100, communication mode information of the mobile terminal 100, battery information of the mobile terminal 100, information regarding an event that has occurred, information regarding a pre-set function, and time information may be output to the state information region 1220.

Also, icons and widgets corresponding to particular applications previously set by the controller 180 or according to a user selection may be fixedly displayed in the pre-set region 1230. In more detail, icons displayed in the pre-set region 1230 may be fixedly displayed at the same position even though a page is changed in the home screen including a plurality of pages. The icons displayed in the pre-set region 1230 may be icons previously set by the user or may be icons of applications most frequently executed among the applications installed in the mobile terminal.

Also, a background screen can be displayed on the display unit 151 according to a user selection or a setting by the controller 180, and the controller 180 can control the display unit 151 to display the background screen and the home screen in an overlapping manner. Meanwhile, when a widget is output to the display unit 151, the background screen may not be displayed, and a background screen output to the widget may be set to be different from a background screen of the home screen.

When a locked state is executed, as illustrated in (b) of FIG. 12A, the display unit 151 is deactivated. When a plurality of touch inputs matched to a pre-set pattern are sensed on the display unit 151, the locked state is released and an execution screen corresponding to characteristics of the sensed touch inputs is displayed. For example, as illustrated in (c) of FIG. 12A, when the number of touches included in a final touch input is one, the home screen is displayed.

Further, when a final touch input, among touch inputs included in the sensed touch inputs, is maintained to be in contact with the mobile terminal (which is called "hold"), rather being released, the controller 180 displays a plurality of graphic objects around a touch point of the final touch input. For example, as illustrated in (b) of FIG. 12B, a final touch input (for example ④), among the sensed touch inputs ①, ②, ③ and ④ and ④, is held, the controller 180 releases a locked state and activates at least a partial region of the display unit 151. The activated region is varied according to a position where the final touch input is sensed, and includes a position where the final touch input is sensed. The controller 180 displays a plurality of graphic objects around a position where the final touch input has been sensed in the at least one activated partial region.

The graphic objects are displayed around a position where the final touch input has been sensed, and include graphic objects respectively corresponding to different functions. Here, the different functions refer to functions that can be executed in the mobile terminal 100. Namely, the different functions may refer to any type of function that can be executed or driven in the mobile terminal 100. For example, the executable function may be an application installed in the mobile terminal 100 or a function required for a system operation of the mobile terminal 100 such as a function of changing configuration information of the mobile terminal 100, a function of outputting a notification panel for displaying an unread event, or the like.

In particular, as illustrated in (c) of FIG. 12B, when the number of touches included in a final touch input is one and the final touch input is held, the controller 180 can display icons included in the pre-set region 1230 of the home screen, around a touch point of the final touch input, response to the holding of the final touch input.

Subsequently, the controller 180 can allow the user to select any one of the graphic objects. In more detail, the controller 180 can select any one graphic object based on a drag input continuously moving from a position corresponding to the final touch input. For example, as illustrated in (c) of FIG. 12B, when a drag input starting form the final touch input (for example, ④) moves to a graphic object formed to execute a camera function, the controller 180 can select a function corresponding to the graphic object, namely, the camera function.

When any one of the graphic objects is selected, the controller 180 executes the selected function. For example, as illustrated in (d) of FIG. 12B, when the camera function is selected, a corresponding execution screen may be displayed in the entire region of the display unit 151.

Meanwhile, types of graphic objects displayed around the final touch input may vary according to characteristics of sensed touch inputs. For example, as illustrated in FIG. 12B, when the number of touches included in a touch input is one, icons included in the pre-set region 1230 of the home screen are displayed.

Further, as illustrated in FIGS. 13A and 13B, when the number of touches included in the touch input is two, graphic objects corresponding to the corresponding characteristics are displayed. In more detail, the controller 180 can select at least one of a plurality of functions that can be executed in the mobile terminal when a locked state is released, based on the characteristics of the sensed touch inputs.

Here, when a final touch input is released within a reference time from a point in time at which the final touch input was input, the controller 180 executes a selected function and displays an execution screen. Further, when the final touch input is held, the controller 180 displays graphic objects related to the selected function in at least on region of the display unit.

In other words, the controller 180 selects a function corresponding to the characteristics of the sensed touch inputs, as a main function. When the final touch input is held, the controller 180 searches sub-functions that belong to the selected main function. The controller 180 subsequently displays different graphic objects formed to execute the searched sub-functions, around the point to which the final touch input was applied. Namely, when the final touch input is held, the controller 81 displays graphic objects corresponding to the sub-functions, and when the final touch input is not held, the controller 180 executes the main function and displays an execution screen according to the execution of the main function.

For example, with respect to a knock code applied by two fingers, a call function (or an application for making a call) may be set as a shortcut function. In this state, when a knock code is applied by two fingers, the controller 180 can select the call function as a main function. Here, as illustrated in (b) of FIG. 13A, the main function is a function of displaying an execution screen including a virtual keypad formed to input a phone number. When the final touch input is released, rather than being held, an execution screen according to execution of the main function is displayed on the display unit 151.

Meanwhile, when the final touch input is held, the controller 180 can select functions forming a sub-menu function of the call function, as sub-functions. For example, functions of performing call origination to a contact number set as bookmark or a contact number included in the recent call list may be selected as sub-functions. In this instance, as illustrated in (b) of FIG. 13B, the controller 180 can display graphic objects formed to perform call origination to a contact number set as bookmark, around the final touch input. In this instance, the graphic objects may include images, information such as a name, or the like, included in the contact number.

Meanwhile, when a drag input continuously moving fro a position corresponding to the final touch input is sensed, as illustrated in (c) of FIG. 13B, the controller 180 can perform call origination to a particular contact number based on the drag input, and display a corresponding execution screen on the display unit 151.

Besides, when a browser execution function is selected as a main function, sub-functions of the browser execution function may be functions of displaying a page registered as bookmark. Also, when a function of activating a camera is selected as a main function, a function of capturing an image and a function of capturing video may be selected as sub-functions.

The main function and sub-functions may be set in advance by the user or may be automatically selected by the terminal. For example, only the main function immediately executed according to first characteristics of the knock code may be set. Even In this instance, when the final touch input among the touch inputs corresponding to the first characteristics is held, the controller 180 can automatically search sub-functions included in the main function and display graphic objects formed to execute the searched sub-functions, around the final touch input.

Thus, even though one knock code is registered, different execution screens are displayed depending on whether a final touch input is held, a simple user interface may be provided.

Meanwhile, as illustrated in FIG. 14, graphic objects displayed on the display unit 151 when the final touch input is held may vary depending on a state of the mobile terminal. For example, when an earphone is installed, graphic objects corresponding to functions that may use the earphone may be displayed. In more detail, graphic objects corresponding to a music play function, a digital multimedia broadcasting (DMB) function, and a video play function may be displayed around the touch point of the final touch input. In addition, various graphic objects may be displayed on the display unit 151 according to various states of the mobile terminal.

Figure 15:
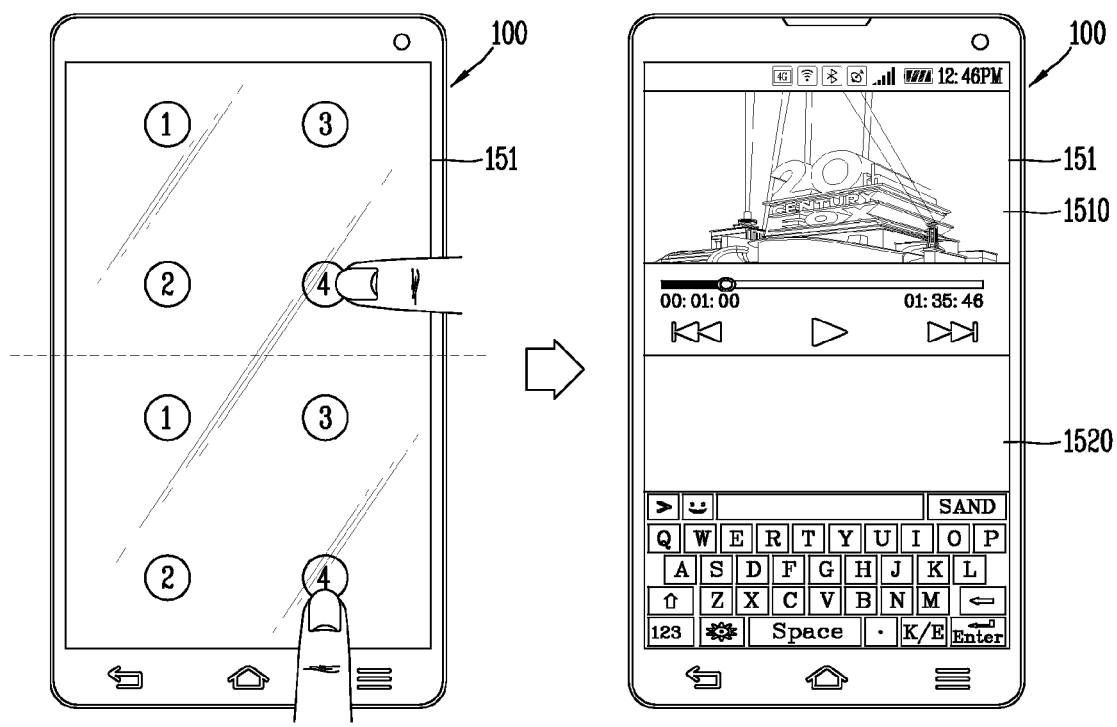
FIGS. 15 and 16 are conceptual views illustrating various examples related to unlocking.
Figure 16:
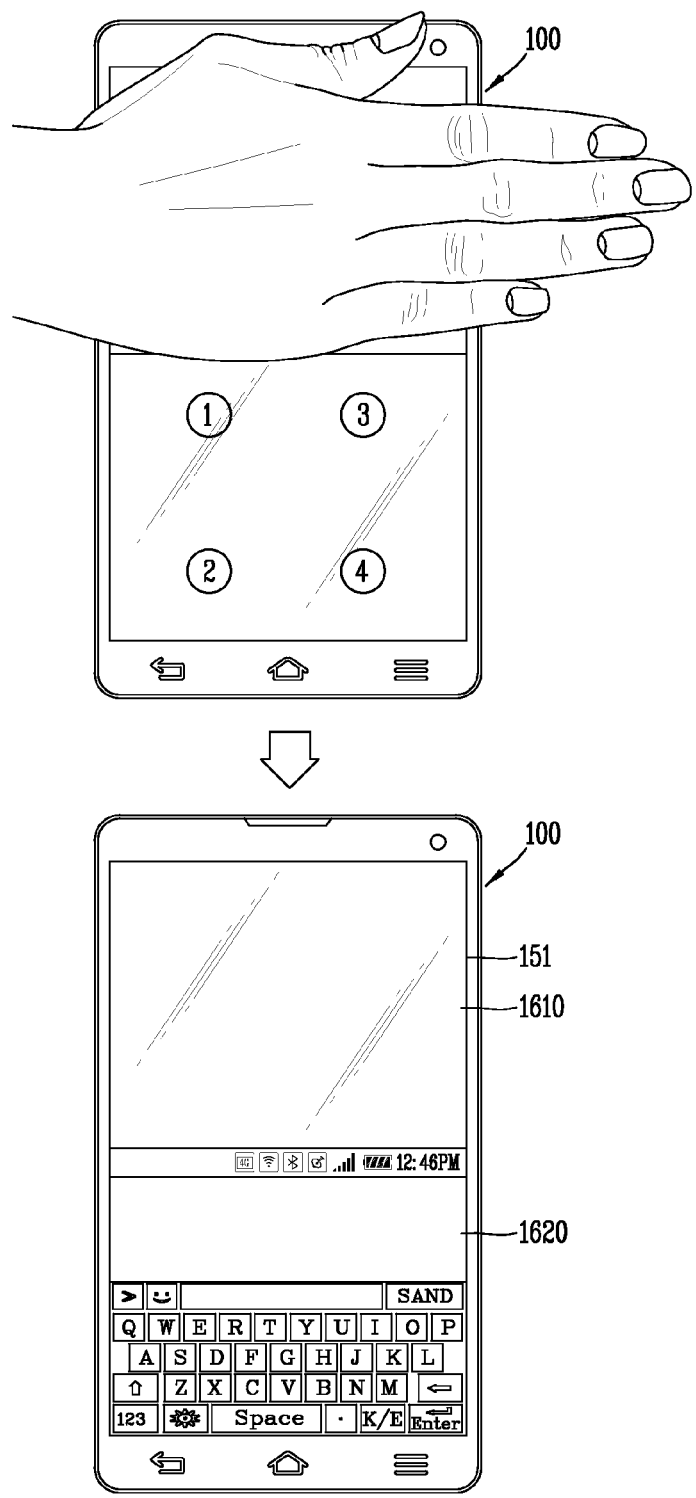

Next, FIGS. 15 and 16 are conceptual views illustrating various examples related to unlocking. According to an embodiment of the present invention, the user may apply different touch inputs with his or her both hands. For example, as illustrated in FIG. 15, a plurality of touch inputs may be applied to an upper region of the display unit with any one of both hands, and a plurality of touch inputs may be applied to a lower region of the display unit with the other hand.

When all the touch inputs applied to the upper region and the lower region satisfy a pre-set pattern, the controller 180 can release a locked state, divide the display unit 151 into first and second regions, and display different execution screens in the first and second regions. For example, execution screens of different applications which have been executed lately may be displayed in the first and second regions 1510 and 1520, respectively.

Also, according to an embodiment of the present invention, the controller 180 can sense a touch input having a predetermined area or greater. As illustrated in FIG. 16, when a touch input having a predetermined area is sensed in a region of the display unit, a plurality of touch inputs matched to a pre-set pattern may be sensed in the other region. In this instance, the controller 180 can release a locked state and simultaneously activate only a partial region of the display unit. For example, a partial region 1610 to which a touch input having a predetermined area or greater has been applied is maintained to be deactivated, while the other region 1620 may be activated to display an execution screen corresponding to characteristics of the plurality of touch inputs.

Figure 17A:
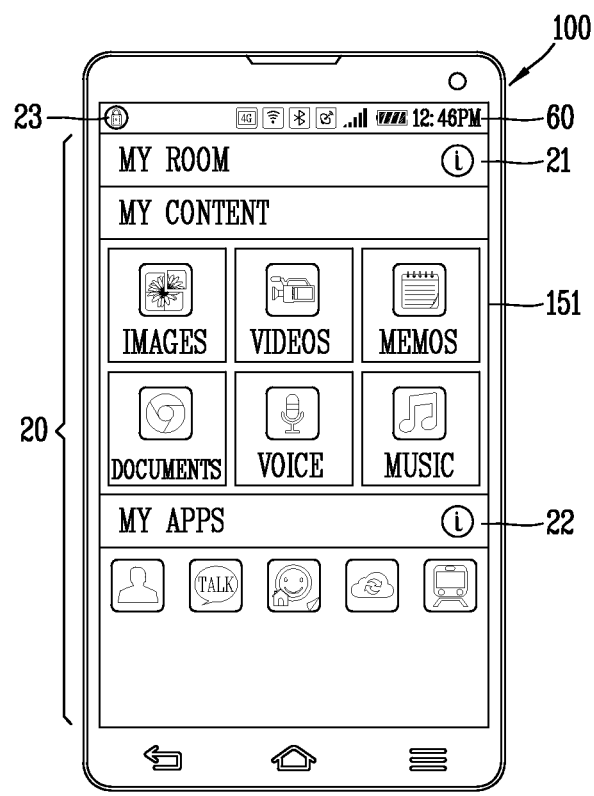
FIGS. 17A through 17G are conceptual views illustrating a method of displaying a closed home screen.
Figure 17B:
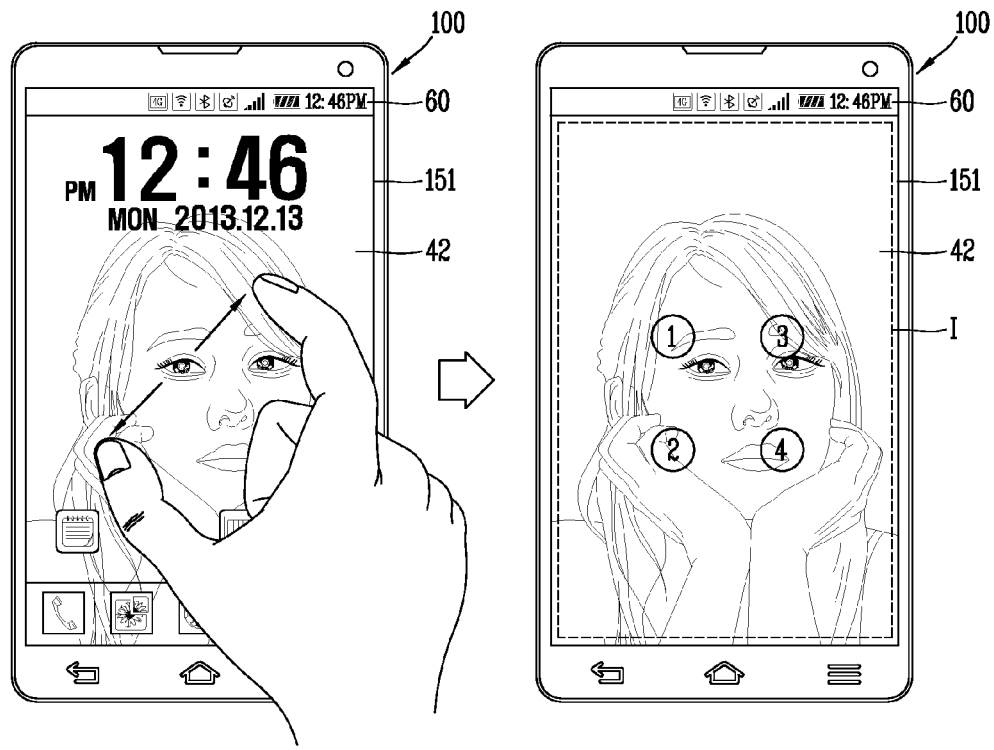

FIGS. 17A through 17G are conceptual views illustrating a method of displaying a closed home screen. In particular, FIGS. 17A and 17B are conceptual views illustrating a method of displaying a closed home screen.

According to an embodiment of the present invention, a new interface may be provided such that user privacy may be simply guaranteed through a unique knock code of a terminal use. In more detail, when a knock code formed to identify a user is input to a touch screen, the controller 180 can display a closed home screen allowing only a user to access. Hereinafter, a closed home screen will be referred to as "my room."

FIG. 17A illustrates a screen corresponding to my room entered by inputting a knock code. The my room may include only user-only accessible content 21, application 22, or the like. The content 21 and the application 22 may be items kept in storage in a secret folder through user manipulation.

Meanwhile, an identifier 23 indicating that the secret folder has been entered may be displayed on the display unit 151. The identifier 23 may be displayed as an icon in an indicator region 60. Also, the identifier may be displayed in the form of unique text (for example, "My Room" or "Owner Mode").

The method of indicating that the secret folder has been entered through input of a user signature is not limited to the foregoing example and may be variously modified to be performed. Means for feeding back entry to the secret folder may include a visual effect, an audible effect, vibration generation, and the like. For example, when the secret folder is entered through input of a user signature, the controller 180 can display the indicator region 60 of the secret folder screen such that it is visually differentiated from that before the secret folder was entered. For example, the controller 180 can change a color of the indicator region 60 and display a changed color.

FIG. 17B is a view illustrating an example of activating a region for inputting a user signature in the mobile terminal according to an embodiment of the present invention. Referring to FIG. 17B, the controller 180 can display at least one icon in a predetermined background screen 42 on the display unit 151.

When a pinch-out input is received on the display unit 151, the controller 180 can remove the at least one icon and maintain displaying only the background screen 42. The controller 180 can activate and display a region (I, called a "knock pad") for receiving a knock code on the background screen 42. When a knock code is input to the knock pad I, the controller 180 outputs my room to the display unit 151.

Meanwhile, in FIGS. 17B, 17D, 17E, 17F, and 17G, the circular figure numbers are virtual figures for guiding order of touch inputs applied to the display unit 151 and touch points. Namely, the circular figure numbers are not output to the display unit 151.

Figure 17C:
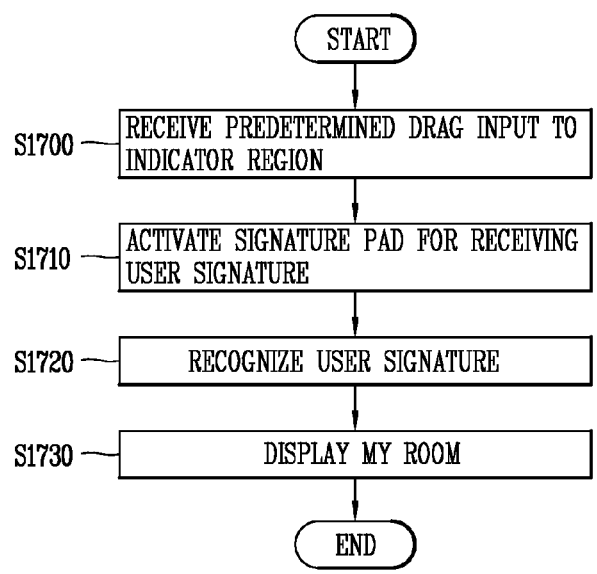

Next, FIG. 17C is a flow chart illustrating an operation of displaying my room using a knock code.

Referring to FIG. 17C, the controller 180 can receive a drag input previously determined with respect to an indicator region in step S1700. The indicator region is an area of a display unit for schematically displaying an operational state of the mobile terminal 100, which may be displayed on the uppermost portion of the display unit 151.

The predetermined drag input may be an input of dragging starting from the indicator region downwardly. The drag input may include a drag input by one finger or a drag input by two fingers of the user. The controller 180 can activate the knock pad to receive a knock code in response to the drag input in step S1710.

Upon receiving the knock code on the knock pad, the controller 180 recognizes an input knock code in step S1720. A method of recognizing a knock code has been described above with reference to FIG. 5, and thus, a detailed description thereof will be omitted. Referring again to FIG. 17C, when the knock code is recognized, the controller 180 can enter a user-only accessible folder and display my room on the display unit 151 in step S1730.

Figure 17D:
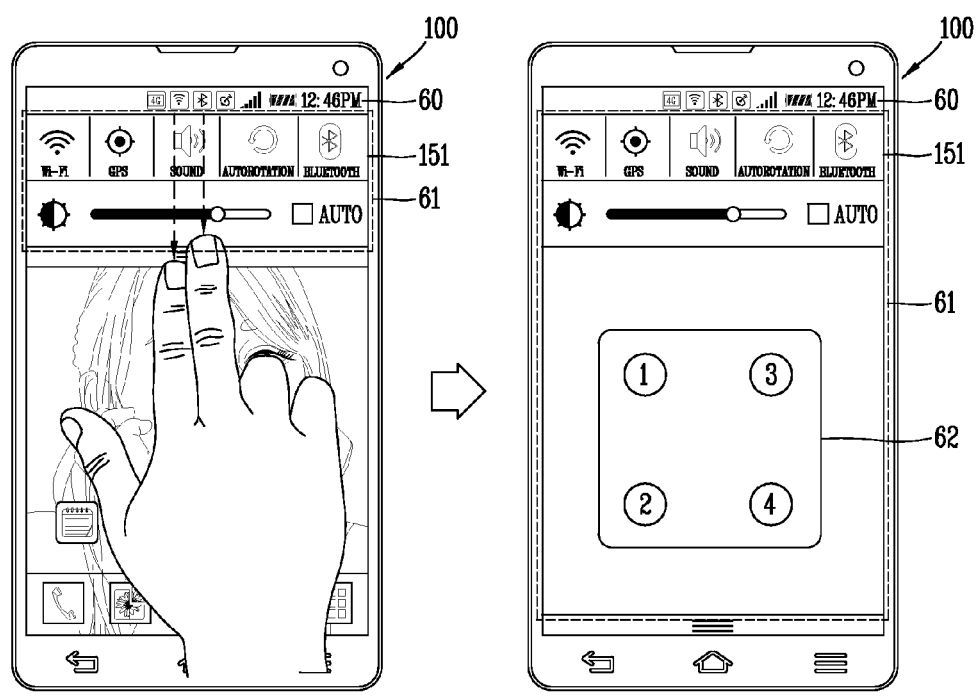

FIGS. 17D through 17G are views illustrating an example of activating a region for receiving a user signature using the method described above with reference to FIG. 17C. Referring to FIG. 17D, the display unit 151 may include an indicator region 60 for displaying state information of the mobile terminal 100.

When a touch input of dragging the indicator region 60 downwardly by a multi-touch is received, a status window 61 slid by the touch input, including a region 62 for receiving a knock code, may be displayed. Namely, when the user drags the indicator region 60 with one finger, the controller 180 can provide a status window including state information of the terminal, while when the user drags the indicator region 60 with two fingers, the controller 180 can provide a knock code input region for entering a secret folder.

Figure 17E:
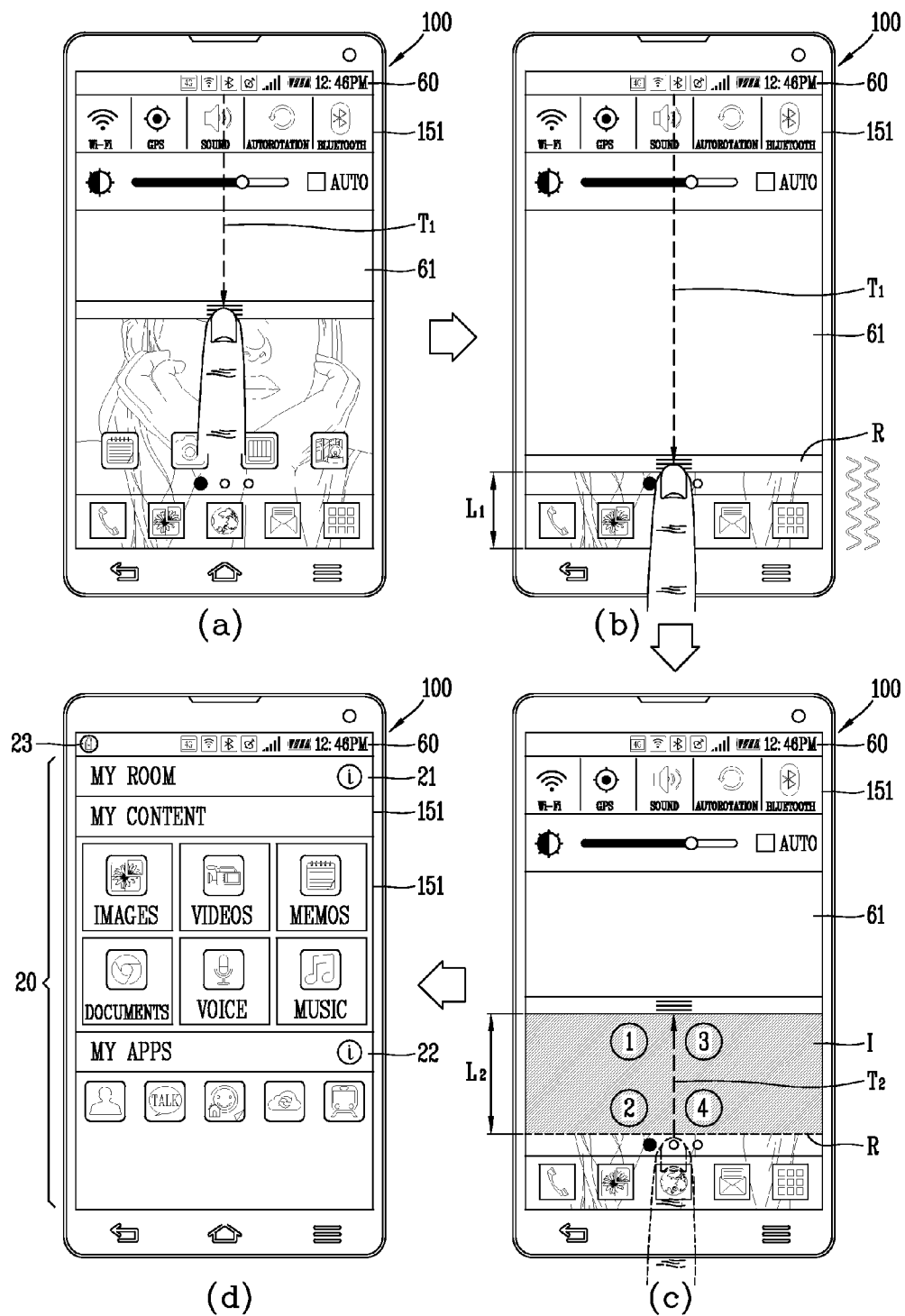

Referring to (a) & (b) of FIG. 17E, the controller 180 can receive an input T1 of dragging the indicator region 60 downwardly and slide the status window 61 to display it. When the status window 61 extends from a lower end of the display unit 151 to reach a particular distance L1, the controller 180 can generate vibration. The vibration may be generated through a haptic module 153 (please refer to FIG. 1A) provided in the mobile terminal. Vibration may be used as a way for informing the user that the knock pad I region can be activated by dragging the status window 61 upwardly.

Referring to (c) of FIG. 17E, the controller 180 can activate the knock pad I by a predetermined length L2 in an upward direction from a point where the vibration is generated. In this instance, the knock pad I and the status window 61 are differentiated, and my room may be entered through the knock pad I region.

Meanwhile, in FIG. 17E, the example in which a point at which the downward drag input turns around to an upward drag input is indicated through vibration has been described, but the notification of the turnaround point may be provided in various manners. For example, when the downward drag input reaches the turnaround point, a color of at least a partial surface of the display unit 151 may be changed.

In FIG. 17E, example in which the indicator region 60 of the display unit 151 is dragged down to reach a predetermined point and turned around to drag up to approach notification information related to a secret folder has been described. However, the knock pad I may be activated, without having to drag down the indicator 60 to the predetermined point. This will be described with reference to FIG. 17F.

Figure 17F:
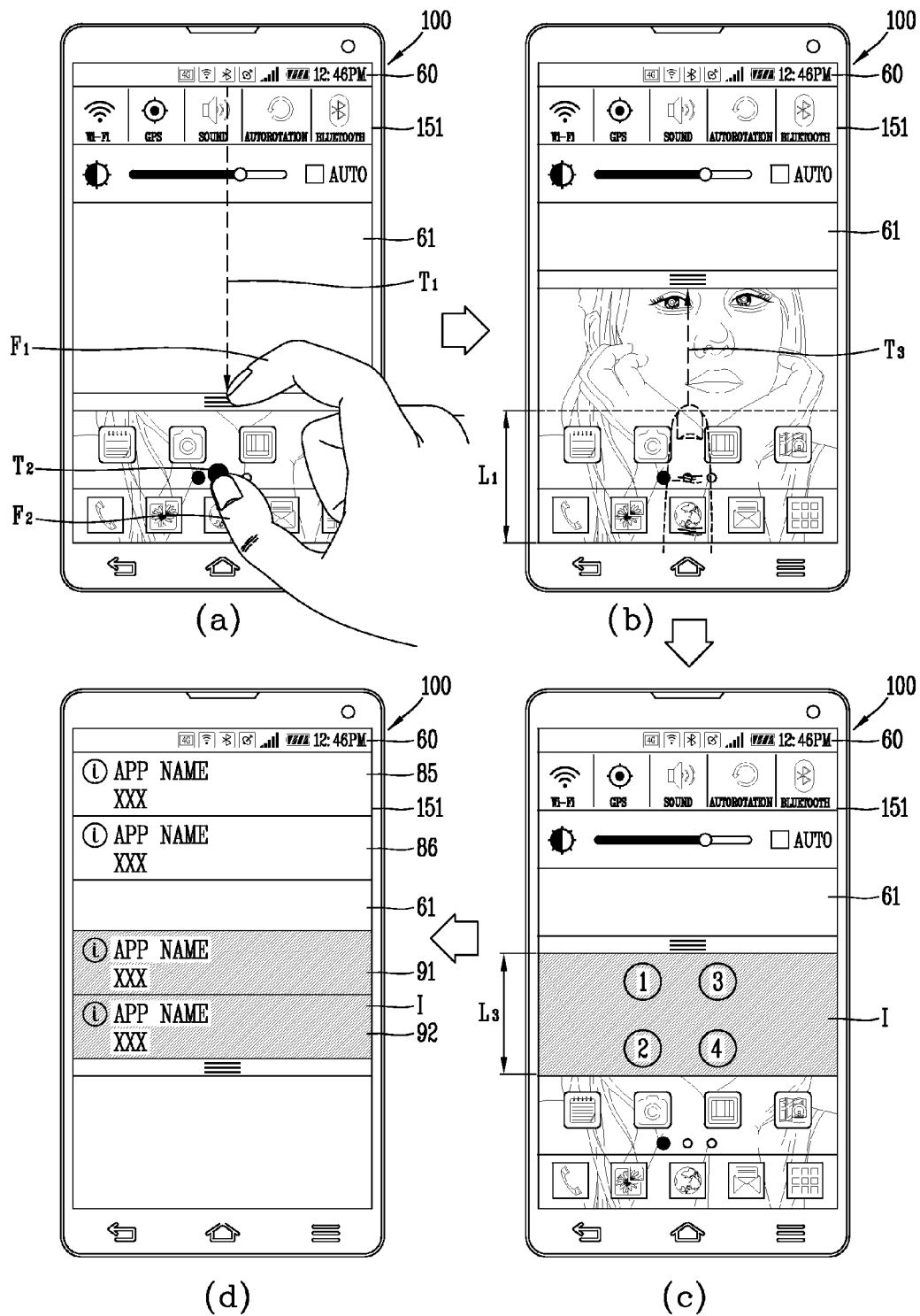

Referring to FIG. 17F, the controller 180 can maintain a downward drag input applied by a first finger to the indicator region 60, and when a touch input applied by the second finger to the display unit 151 is received, the controller 180 can fix a position of the downwardly dragged status window 61.

In more detail, after a first input T1 dragging down the indicator region 60 with a first finger F1 of the user is received, the controller 180 can receive a second input T2 of touching a certain point in the vicinity of the dragged point or within a particular distance L1 from a lower end of the display unit 151 by a second finger F2, with the first input T1 maintained. General status information of the mobile terminal 100 may be displayed on the status window 61 slid to be shown by the first input T1. Here, when only the first input T1 is received and the second input T2 does not exist, if the first input 1 is released (the drag input is released), the status window 61 may be returned to the original state (may be dragged up to disappear).

In addition, when the status window 61 is fixed to the second input T2 point according to the second input T2, a third input T3 of dragging up the status window 61 may be received. The third input T3 may be an input dragging up from the point of the second input T2 by a predetermined length (for example, L3). Then, the controller 180 can activate the knock pad I corresponding to the predetermined length L3. The status window 61 is displayed above the knock pad I.

When a user signature is received in the activated knock pad I, the controller 180 can display my room in at least one region of the display unit 151. For example, notification information 91 and 92 related to the secret folder may be displayed in the knock pad I. Meanwhile, the status window 61 displayed on the knock pad I may display general status information 85 and 86 of the mobile terminal 100.

In addition, a rear surface of the mobile terminal 100 according to an embodiment of the present invention may include a rear input module. The rear input module may be positioned to be adjacent to the camera module exposed from the rear surface of the terminal body. The rear input module is manipulated to receive an input for controlling an operation of the mobile terminal 100, and various types of content may be input. For example, a command such as ON/OFF of power, start, end, scroll, or the like, adjustment of a size of a sound output from an audio output module, switch to a touch input mode of the display unit, or the like, may be received.

According to an embodiment of the present invention, a position of the dragged-down status window 61 may be fixed through input applied to the rear input module. Namely, referring to FIG. 17F, when the first input T1 has been received and the second input T2 does not exist, when the foregoing rear surface input is received, a position of the status window 61 may be fixed to a position corresponding to a point in time at which the rear surface input has been received. Also, an input pattern for fixing the status window 61 dragged down according to a downward drag input applied to the indicator region 60 may be variously modified to be performed.

Figure 17G:
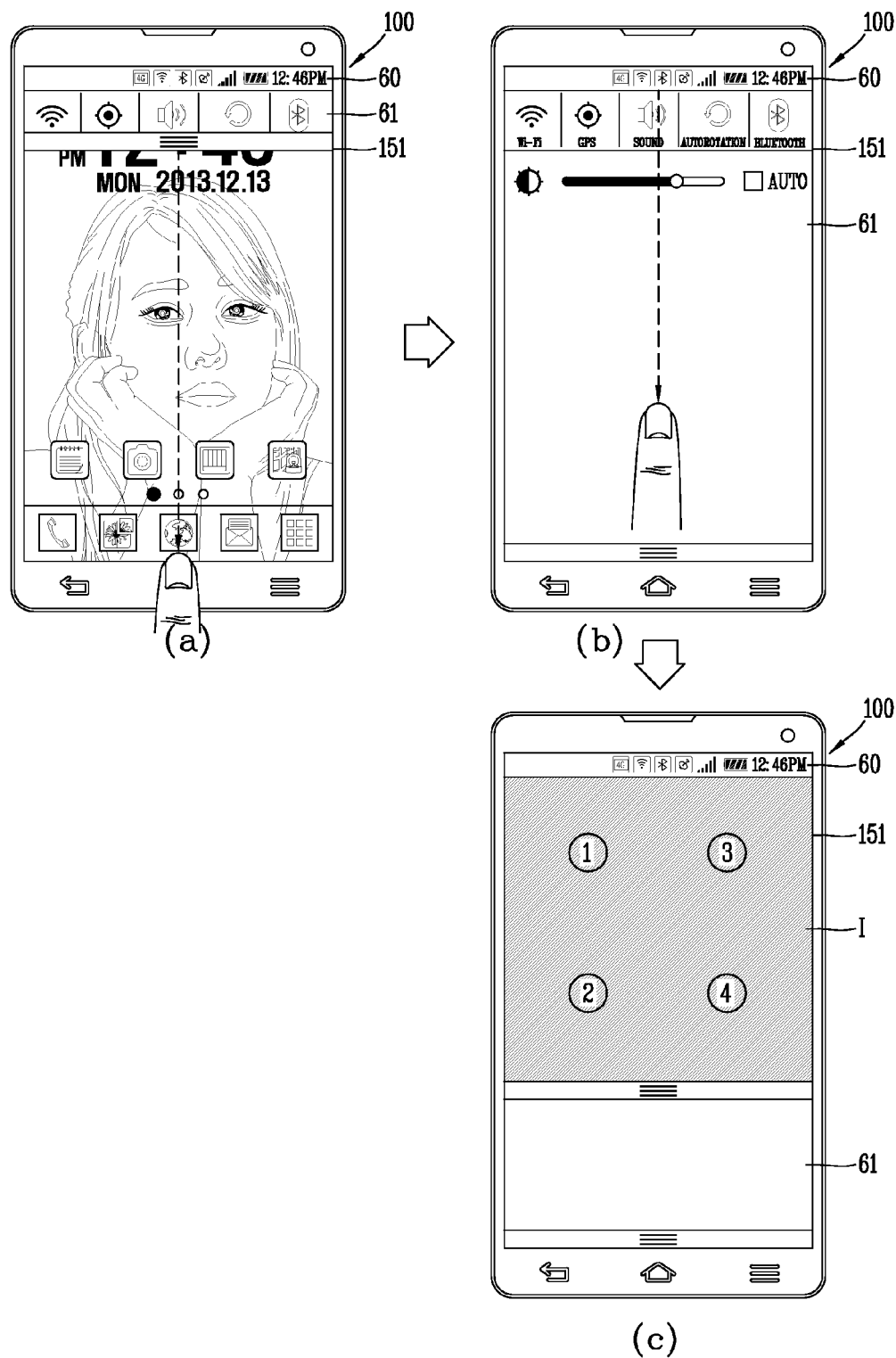

Referring to FIG. 17G, when the display unit 151 is activated, the controller 180 can sense a touch applied to one end of the display unit 151. In this instance, in response to the touch sensed on the one end of the display unit 151, the controller 180 can output at least a portion of the status window 61 slid by a touch input on the display unit 151.

Subsequently, when the touch continues to move from one end to the other end, the controller 180 can change a display region of the status window 61 based on the movement of the touch. For example, when the touch continuously moves down from one point of an upper end of the display unit 151, a display region of the status window 61 may be enlarged from the upper end of the display unit 151 to a position where the touch is terminated. Namely, an animation effect as if the status window 61 goes down from the upper end may be generated.

The status window 61 may include graphic objects for setting function required for basic driving of the mobile terminal. For example, the required functions may include a function of turning on or off Wi-Fi, a function of activating or deactivating Bluetooth, a function of establishing a communication network, a function of changing configuration information of the mobile terminal, and the like.

Meanwhile, when the status window 61 is displayed, a touch may be applied to one end of the display unit 151 from which the status window 61 first started to be displayed. In this instance, in response to the touch sensed on the one end of the display unit 151, the controller 180 can output at least a portion of the knock pad 62 to the display unit 151.

Subsequently, when the touch continues to move from the one end to the other end, the controller 180 can change a display region of the knock pad 62 based on the movement of the touch. Accordingly, an effect as if a plurality of window overlap with each other may be provided.

Meanwhile, when the knock pad 62 is displayed, the controller 180 can sense a plurality of touch inputs. Also, as described above with reference to FIG. 17A, the controller 180 can display my room based on the sensed touch inputs.

According to the embodiment of the present invention described above with reference to FIG. 17, a secret folder of the user may be easily accessed using a user-specific knock code set by the user. Meanwhile, when a knock code on the knock pad I is recognized, the controller 180 can display notification information of an application concealed in a secret folder on the knock pad I.

Even without having to enter the secret folder, the user may be conveniently provided with various types of notification information regarding items kept in storage in the secret folder by utilizing the indicator region. Namely, in general, in order to check update information regarding items kept in the secret folder, a user should enter the secret folder through input of a knock code and select an updated application, thus checking updated content.

However, according to an embodiment of the present invention, when a knock code is received through the indicator region of the mobile terminal, notification information related to the secret folder can be easily accessed using the indicator region, without having to perform the plurality of steps as described above.

Figure 18A:
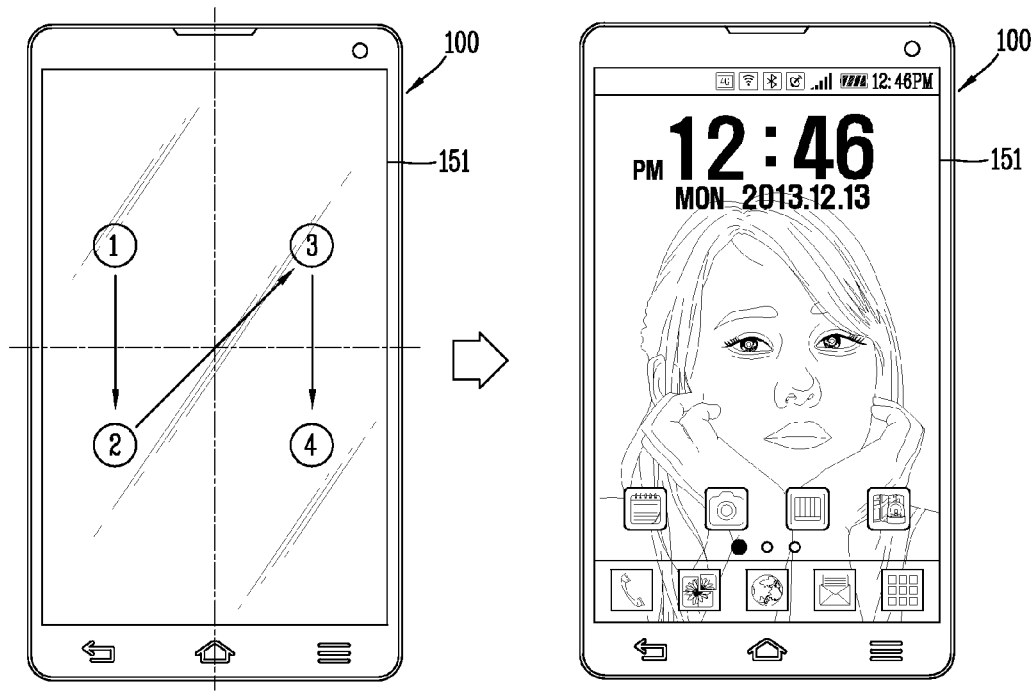
FIGS. 18A and 18B are conceptual views illustrating an example of releasing a locked state by various patterns applied to a deactivated display unit.
Figure 18B:
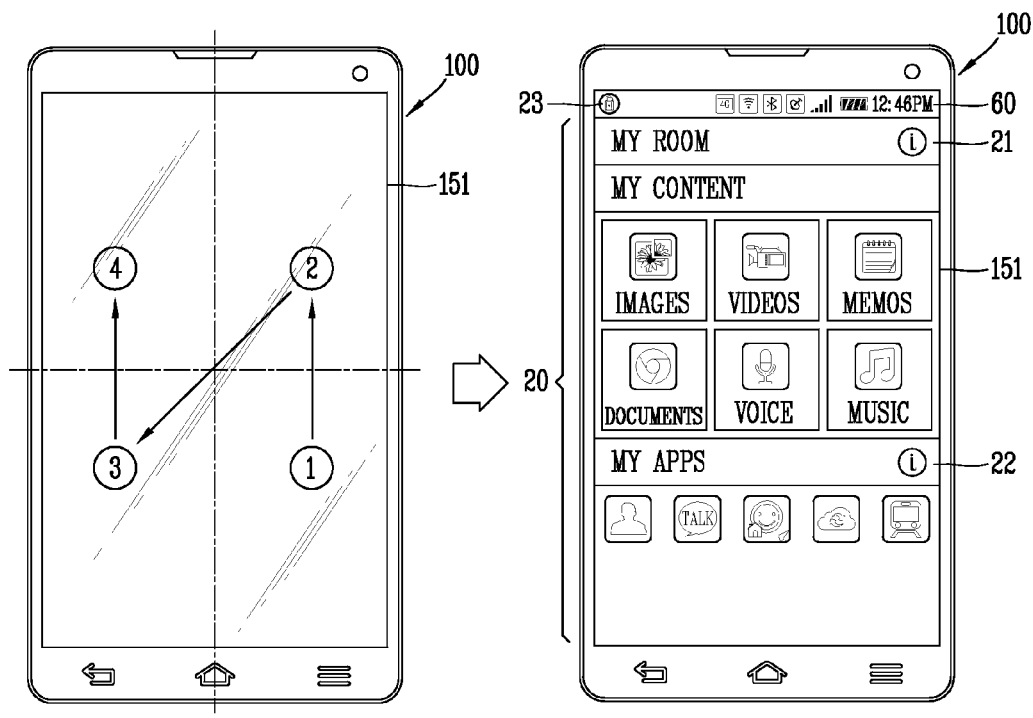

Next, FIGS. 18A and 18B are conceptual views illustrating an example of releasing a locked state by various patterns applied to a deactivated display unit. Referring to FIG. 18A, when first to touch inputs ①, ②, ③, and ④ are sequentially sensed in a first virtual region→a second virtual region→a third virtual region→a fourth virtual region, respectively, a home screen may be displayed. Namely, a single knock code for releasing a locked state may be set in advance.

In this instance, the user can apply a plurality of touch inputs that touch one region according to a pre-set pattern among the virtual regions of the display unit 151 in a deactivated state in reverse order of the pre-set order. For example, as illustrated in FIG. 18B, when touch inputs are applied in reverse order of the touch order of the pre-set knock code, the controller 180 can release the locked state and display my room as described above with reference to FIG. 17 on the display unit 151. The reverse order refers to order in which the first to fourth touch inputs (①, ②, ③, and ④) are sequentially sensed on the fourth virtual region→the third virtual region→the second virtual region→the first virtual region.

Namely, when the touch inputs are applied in the pre-set order, the home screen is displayed when the locked state is released, and when the touch inputs are applied in reverse order of the pre-set order, my room is displayed when the locked state is released.

So far, the method of displaying various execution screens using one knock code has been described in detail. However, according to another embodiment of the present invention, the locked state may be released by different patterns and the deactivated display unit 151 may be switched to an activated state. Also, the plurality of patterns may be set to display different execution screens. For example, a first knock code may be set to display a first execution screen, and a second knock code may be set to display a second execution screen. Namely, various execution screens may be displayed by various patterns.

Figure 19:
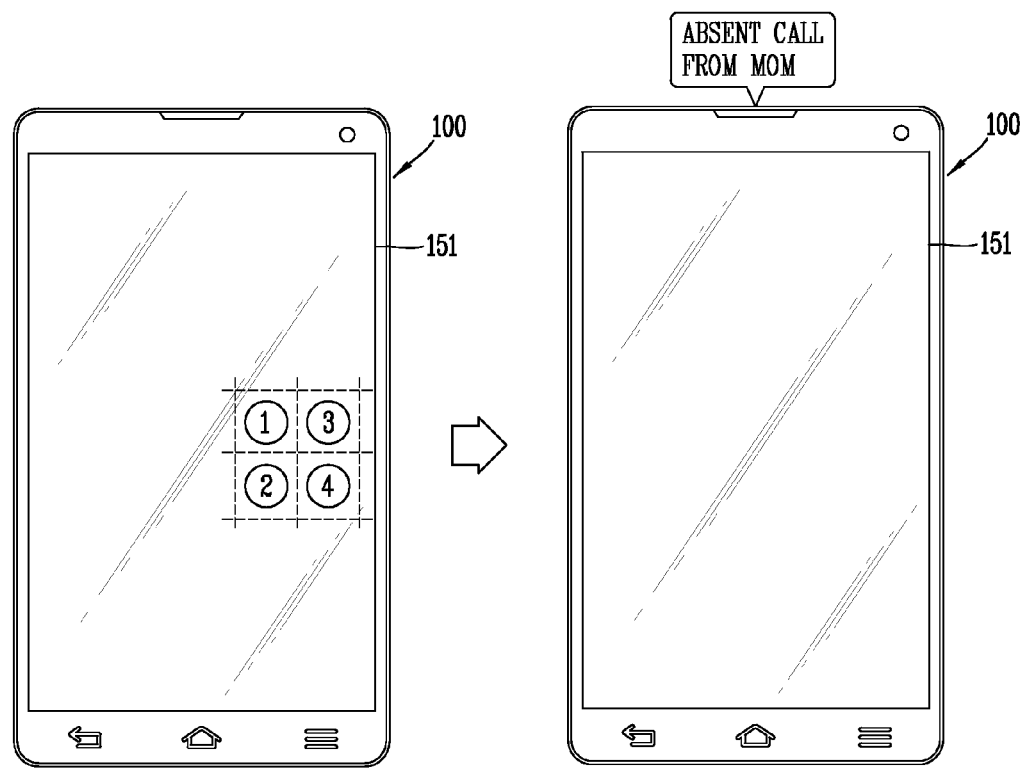
FIG. 19 is a conceptual view illustrating a mobile terminal according to an embodiment of the present invention, in which voice information is output, instead of switching a display unit to an activated state when a knock code is input.

Next, FIG. 19 is a conceptual view illustrating a mobile terminal according to an embodiment of the present invention, in which voice information is output, instead of switching a display unit to an activated state when a knock code is input.

In the mobile terminal according to an embodiment, even when the display unit 151 is deactivated (or in an OFF state), a speed at which a plurality of touch inputs are applied may be calculated. In more detail, the controller 180 can calculate a speed at which touch inputs are applied using a time difference between a first applied touch input and a finally applied touch input among a plurality of touch inputs matched to a pre-set pattern.

In order to release a locked state, the controller 180 can determine whether to activate the display unit 151 based on the calculated speed. In more detail, when touch inputs are applied at a speed faster than a reference speed, the controller 180 can output context information by voice using the audio output unit 152 (please refer to FIG. 1), rather than activating the display unit 151. Thus, in response to the touch inputs sensed to be faster than the reference speed, the controller 180 can output state information (for example, event reception information, current time information, weather information state information of the mobile terminal (a battery, a communication state, a position, and the like)) of the mobile terminal. Further, when touch inputs are applied at a speed equal to or lower than the reference speed, the controller 180 can activate the display unit 151 and display an execution screen corresponding to the characteristics of the touch inputs.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely and are not to be considered as limiting the present invention. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the embodiments described herein may be combined in various ways to obtain additional and/or alternative embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal comprising:
a terminal body;
a display unit configured to switch between an activated state in which lighting is turned on and a deactivated state in which lighting is turned off; and
a controller configured to:
sense a plurality of touch inputs applied to the display unit when the display unit is deactivated,
release a locked state of the terminal, when the sensed touch inputs are matched to a pre-set pattern,
switch the deactivated display unit to an activated state, and
selectively display on the activated display unit at least one execution screen based on characteristics of the sensed touch inputs among a plurality of pre-set execution screens,
wherein:
the display unit is divided into a plurality of regions respectively corresponding to different execution screens in the deactivated state,
the controller is further configured to selectively display at least one execution screen based on a position of a region to which the sensed touch inputs have been applied, and display an execution screen corresponding to any one region to which the sensed touch inputs have been applied among the plurality of regions, when the sensed touch inputs are sensed in a first region of a display region of the display unit, the controller is further configured to execute a function set by a user and display an execution screen of the executed function, and when the sensed touch inputs are sensed in a second region different from the first region of the display region, the controller is further configured to display a home screen.

2. The mobile terminal of claim 1, wherein the characteristics of the sensed touch inputs correspond to at least one of a position of a region to which the sensed touch inputs have been applied, a size of the region to which the sensed touch inputs have been applied, a type of an object used to apply the sensed touch inputs, and the number of touches included in a final touch input among the sensed touch inputs.

3. The mobile terminal of claim 2, wherein when the sensed touch inputs are matched to the pre-set pattern and have first characteristics, the controller is further configured to release the locked state and display a first execution screen on the display unit, and when the sensed touch inputs are matched to the pre-set pattern and have second characteristics different from the first characteristics, release the locked state and display a second execution screen different from the first execution screen.

4. The mobile terminal of claim 1, wherein the controller is further configured to selectively display the at least one execution screen based on a type of an object used to apply the touch inputs.

5. The mobile terminal of claim 1, wherein the controller is further configured to selectively display the at least one execution screen based on the number of touches included in a final touch input among the sensed touch inputs.

6. The mobile terminal of claim 1, wherein the plurality of pre-set execution screens include different home screens set for multiple users, and when the sensed touch inputs are matched to a pre-set pattern, the controller is further configured to perform a log-in with respect to any one user based on characteristics of the sensed touch inputs among the multiple users and display a home screen corresponding to the any one user.

7. The mobile terminal of claim 1, wherein the controller is further configured to execute a function corresponding to the at least one execution screen.

8. A mobile terminal comprising:
a terminal body;
a display unit configured to switch between an activated state in which lighting is turned on and a deactivated state in which lighting is turned off; and
a controller configured to:
sense a plurality of touch inputs applied to the display unit when the display unit is deactivated,
release a locked state of the terminal, when the sensed touch inputs are matched to a pre-set pattern,
switch the deactivated display unit to an activated state, and
selectively display on the activated display unit at least one execution screen based on characteristics of the sensed touch inputs among a plurality of pre-set execution screens,
wherein when a final touch input among the sensed touch inputs is not released but maintained for a pre-set period of time, the controller is further configured to cause displaying of graphic objects corresponding to different functions on the display unit, and
wherein types of the graphic objects are varied depending on characteristics of the sensed touch inputs.

9. The mobile terminal of claim 8, wherein the graphic objects are formed to execute different functions and include icons fixedly displayed at the same position even though a page of a home screen including a plurality of pages is shifted.

10. The mobile terminal of claim 8, wherein when a drag input starting from the final touch input to any one of the graphic objects is sensed, the controller is further configured to execute a function corresponding to the any one of the graphic objects.

11. The mobile terminal of claim 8, wherein the display unit is divided into virtual regions and the sensed touch inputs include a plurality of touch inputs sequentially applied to at least one region according to a pre-set pattern among the virtual regions in pre-set order.

12. The mobile terminal of claim 11, wherein at least one of a position and a size of the virtual regions on the display unit is varied based on a touch point at which the plurality of touch inputs are sensed on the display unit.

* * * * *